United States Patent
Fukuda et al.

(10) Patent No.: US 10,746,234 B2
(45) Date of Patent: Aug. 18, 2020

(54) AUTOMATIC TRANSMISSION

(71) Applicant: MAZDA MOTOR CORPORATION, Hiroshima (JP)

(72) Inventors: Yutaro Fukuda, Hiroshima (JP); Tadashi Saito, Hiroshima (JP); Masahiro Kaji, Hiroshima (JP); Manabu Sasahara, Hiroshima (JP); Tomohiro Kubo, Hiroshima (JP); Shinya Kamada, Kure (JP); Norio Iwashita, Hiroshima (JP); Kaori Sako, Hiroshima (JP); Tomotaka Ishizaka, Hiroshima (JP); Tatsuhiko Iwasaki, Hiroshima (JP); Koshiro Saji, Tokai (JP); Tatsutoshi Mizobe, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 269 days.

(21) Appl. No.: 15/763,552

(22) PCT Filed: Feb. 16, 2017

(86) PCT No.: PCT/JP2017/005788
§ 371 (c)(1),
(2) Date: Mar. 27, 2018

(87) PCT Pub. No.: WO2017/145916
PCT Pub. Date: Aug. 31, 2017

(65) Prior Publication Data
US 2018/0274600 A1   Sep. 27, 2018

(30) Foreign Application Priority Data

Feb. 23, 2016 (JP) ................................ 2016-032044
May 30, 2016 (JP) ................................ 2016-107005

(51) Int. Cl.
*F16D 25/0638* (2006.01)
*F16D 48/02* (2006.01)
(Continued)

(52) U.S. Cl.
CPC ...... *F16D 25/0638* (2013.01); *F15B 15/1447* (2013.01); *F16D 48/02* (2013.01);
(Continued)

(58) Field of Classification Search
CPC .. F16D 25/0638; F16D 48/02; F16H 63/3026; F16K 31/363; F15B 15/1447;
(Continued)

(56) References Cited

U.S. PATENT DOCUMENTS 3,647,037 A    3/1972 Toma
5,281,190 A *  1/1994 Koivunen ........... F16D 25/0638
                                           192/101
(Continued)

FOREIGN PATENT DOCUMENTS

DE    102012218915 A1   4/2014
JP    S62-093555 A       4/1987
(Continued)

OTHER PUBLICATIONS

International Search Report issued in PCT/JP2017/005788; dated May 16, 2017.
(Continued)

*Primary Examiner* — David R Morris
*Assistant Examiner* — Lillian T Nguyen
(74) *Attorney, Agent, or Firm* — Studebaker & Brackett PC

(57) ABSTRACT

An automatic transmission includes a piston movable in an axial direction, a plurality of friction plates disposed on a side of a first surface of the piston, a fastening hydraulic chamber applying a hydraulic pressure to a second surface
(Continued)

of the piston to move the piston to a fastening position where the friction plates are pressed to be fastened to each other, a release hydraulic chamber applying a hydraulic pressure to the first surface of the piston to move the piston to a release position where the friction plates are released, and a hydraulic pressure control valve that supplies and discharges the hydraulic pressure to and from each of the fastening hydraulic chamber and the release hydraulic chamber. An area of the second surface of the piston for receiving the hydraulic pressure is set to be larger than an area of the first surface for receiving the hydraulic pressure.

16 Claims, 11 Drawing Sheets

(51) Int. Cl.
| | |
|---|---|
| *F15B 15/14* | (2006.01) |
| *F16K 31/363* | (2006.01) |
| *F16H 63/30* | (2006.01) |
| *F16H 3/66* | (2006.01) |
| *F16H 3/44* | (2006.01) |
| *F15B 15/20* | (2006.01) |
| *F15B 15/17* | (2006.01) |

(52) U.S. Cl.
CPC ....... *F16H 63/3026* (2013.01); *F16K 31/363* (2013.01); *F15B 15/17* (2013.01); *F15B 15/204* (2013.01); *F15B 2211/7053* (2013.01); *F16D 2048/0221* (2013.01); *F16H 3/66* (2013.01); *F16H 2003/442* (2013.01); *F16H 2200/006* (2013.01); *F16H 2200/2012* (2013.01); *F16H 2200/2043* (2013.01)

(58) Field of Classification Search
CPC . F15B 15/17; F15B 2211/7053; F15B 15/204
See application file for complete search history.

(56) References Cited

U.S. PATENT DOCUMENTS

| | | | | |
|---|---|---|---|---|
| 5,421,439 | A * | 6/1995 | Hayasaki | F16D 25/0638 192/106 F |
| 5,542,517 | A * | 8/1996 | Peruski | F16D 25/0638 192/106 F |
| 6,142,280 | A * | 11/2000 | Koike | F16D 25/0638 192/113.34 |
| 6,599,215 | B2 * | 7/2003 | Takatori | F16H 61/061 475/120 |
| 2003/0075413 | A1 * | 4/2003 | Alfredsson | F16D 48/02 192/48.619 |
| 2003/0111314 | A1 * | 6/2003 | Moorman | F16D 25/0638 192/85.25 |
| 2012/0211325 | A1 | 8/2012 | Morise et al. | |
| 2017/0184160 | A1 | 6/2017 | Yamamoto et al. | |
| 2018/0347639 | A1 * | 12/2018 | Ishizaka | F16D 25/14 |

FOREIGN PATENT DOCUMENTS

| | | |
|---|---|---|
| JP | S63-045249 U | 3/1988 |
| JP | H02-003706 A | 1/1990 |
| JP | H04-069414 A | 3/1992 |
| JP | H10-131984 A | 5/1998 |
| JP | H11-153152 A | 6/1999 |
| JP | 2010-190278 A | 9/2010 |
| WO | 2015/159955 A1 | 10/2015 |

OTHER PUBLICATIONS

An Office Action; "Notification of Reasons for Rejection," issued by the Japanese Patent Office dated Dec. 20, 2017, which corresponds to Japanese Patent Application No. 2016-107005.
Extended European Search Report issued by the European Patent Office dated Oct. 29, 2018, which corresponds to EP17756355.8-1012 and is related to U.S. Appl. No. 15/763,552.

* cited by examiner

FIG.2

| | CL1 (31) | CL2 (32) | CL3 (33) | BR1 (21) | BR2 (22) |
|---|---|---|---|---|---|
| FIRST FORWARD GEAR | ○ | | | ○ | ○ |
| SECOND FORWARD GEAR | | ○ | | ○ | ○ |
| THIRD FORWARD GEAR | ○ | ○ | | | ○ |
| FOURTH FORWARD GEAR | | ○ | ○ | | ○ |
| FIFTH FORWARD GEAR | ○ | | ○ | | ○ |
| SIXTH FORWARD GEAR | ○ | | ○ | | |
| SEVENTH FORWARD GEAR | | ○ | ○ | ○ | |
| EIGHTH FORWARD GEAR | | | ○ | ○ | |
| BACK GEAR | | | | ○ | ○ |

AUTOMATIC TRANSMISSION

TECHNICAL FIELD

The present invention relates to an automatic transmission that includes a friction fastening element including a plurality of friction plates and a piston.

BACKGROUND ART

An automatic transmission incorporated in a vehicle such as an automobile includes a planetary gear set and a plurality of friction fastening elements such as a multi-plate clutch and a multi-plate brake. As the friction fastening elements are selectively fastened according to the operation state of an engine, it is possible to automatically shift to a predetermined gear position. The friction fastening element includes a plurality of friction plates disposed with a clearance therebetween and a piston pressing the friction plates. The piston is moved between a fastening position where the friction plates are pressed to be fastened to each other and a release position where pressing of the friction plates is released and thus the friction plates are in a released state.

Patent Literature 1 discloses an automatic transmission in which a fastening hydraulic chamber is disposed on one side in an axial direction of a piston and a centrifugal hydraulic chamber (release hydraulic chamber) is disposed on the other side, and a through-hole through which the fastening hydraulic chamber communicates with the centrifugal hydraulic chamber is formed in the piston. A predetermined hydraulic pressure is supplied from different oil passages to the fastening hydraulic chamber and the centrifugal hydraulic chamber. A pressure regulator valve is assembled in the oil passage for the centrifugal hydraulic chamber.

It is necessary in the automatic transmission to shorten a fastening control time while reducing a fastening shock applied to the friction fastening elements when being switched from a released state to a fastened state. To shorten the fastening control time and reduce the fastening shock at the same time, it is necessary to cause a large flow rate of oil to flow at a precharge hydraulic pressure or the like for the purpose of shortening the fastening control time, and at the same time, to reduce the flow rate (reduce the hydraulic pressure) of oil immediately before a stroke is completed for the purpose of reducing the fastening shock. In this case, precise flow rate control must be executed, so that hydraulic pressure control tends to be complicated. Consequently, it takes a long time to execute fastening control for fastening the friction fastening elements, thus reducing response of the friction fastening elements.

CITATION LIST

Patent Literature

Patent Literature 1: JP 10-131984 A

SUMMARY OF INVENTION

An object of the present invention is to provide an automatic transmission including a friction fastening element that can reduce a fastening shock without requiring complicated hydraulic pressure control and can shorten a fastening control time.

An automatic transmission according to an aspect of the present invention includes a piston that has a first surface and a second surface opposing to each other in an axial direction and that is movable in the axial direction, a plurality of friction plates disposed on a side of the first surface of the piston, a fastening hydraulic chamber that applies a hydraulic pressure to the second surface of the piston to move the piston to a fastening position where the friction plates are pressed to be fastened to each other, a release hydraulic chamber that applies a hydraulic pressure to the first surface of the piston to move the piston to a release position where the friction plates are released, a hydraulic pressure control valve that has an output port of the hydraulic pressure, and supplies and discharges the hydraulic pressure to and from each of the fastening hydraulic chamber and the release hydraulic chamber, a first oil passage that allows the output port of the hydraulic pressure control valve to communicate with the fastening hydraulic chamber, and a second oil passage that allows the output port to communicate with the release hydraulic chamber. An area of the second surface of the piston for receiving the hydraulic pressure is set to be larger than an area of the first surface for receiving the hydraulic pressure.

BRIEF DESCRIPTION OF DRAWINGS

FIG. 2 is a fastening table of friction fastening elements included in the automatic transmission.

DESCRIPTION OF EMBODIMENTS

[Overall Configuration of Automatic Transmission]

Figure 1:
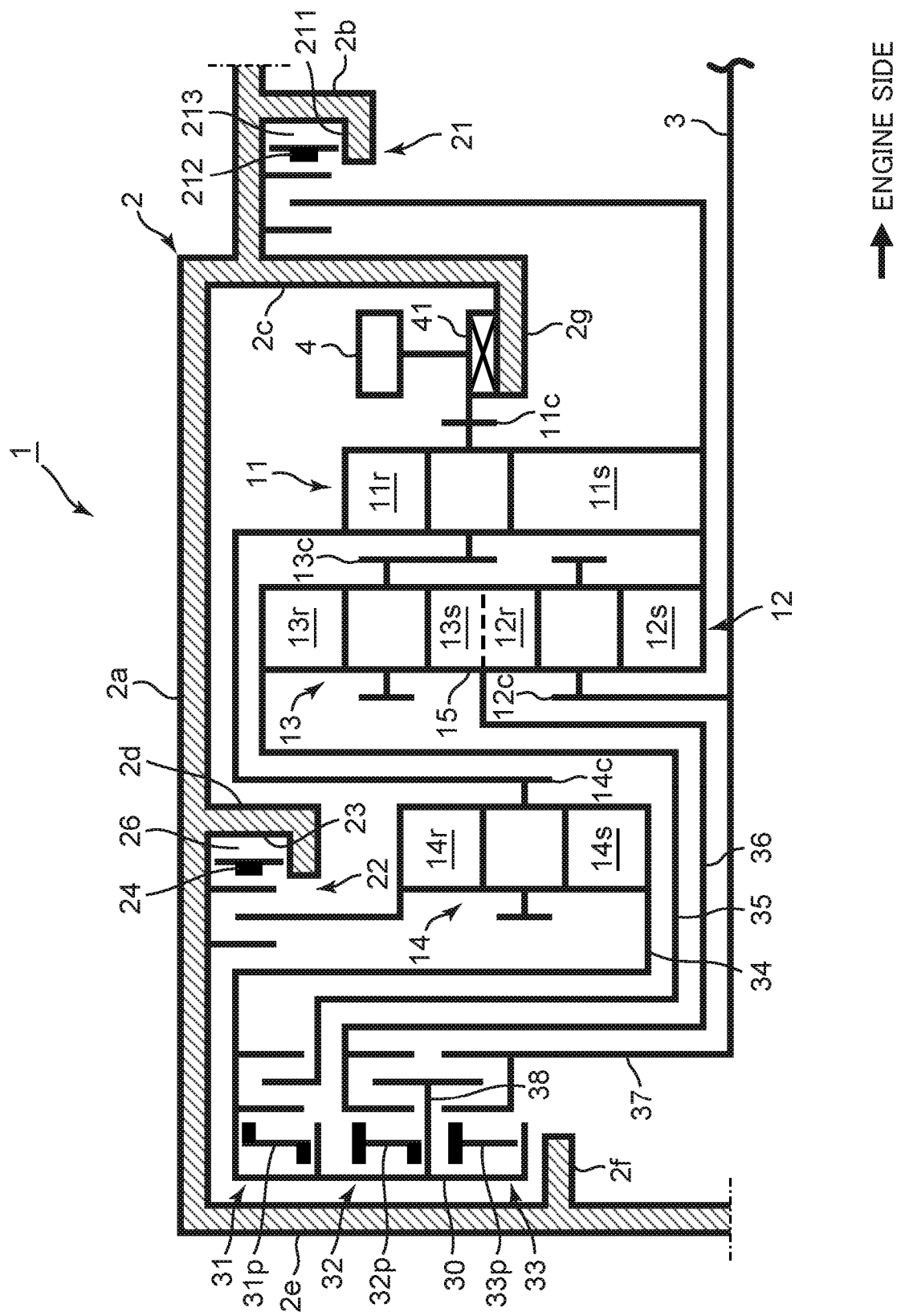
FIG. 1 is a conceptual diagram of an automatic transmission according to an embodiment of the present invention.

FIG. 1 is a conceptual diagram of a configuration of an automatic transmission 1 for an automobile (a vehicle) according to an embodiment of the present invention. The automatic transmission 1 includes a transmission case 2, an input shaft 3 that is disposed within the transmission case 2 and extends from an engine side, an output gear 4, four planetary gear sets functioning as transmission mechanisms (a first planetary gear set 11, a second planetary gear set 12, a third planetary gear set 13, and a fourth planetary gear set 14), two brakes (a first brake 21 and a second brake 22), and three clutches (a first clutch 31, a second clutch 32, and a third clutch 33).

Power generated in an engine is input to the input shaft 3. The output gear 4 outputs drive force having a predetermined transmission ratio determined by the transmission mechanism. The present embodiment exemplifies a so-called torque-converter-less automatic transmission in which power from an engine is input to an input unit not via a torque converter (a hydraulic transmission device).

The transmission case 2 includes an outer peripheral wall 2a, a first middle wall 2b at an end part of the outer peripheral wall 2a on an engine side, a second middle wall 2c on the side, of the first middle wall 2b, opposite to the engine side, a third middle wall 2d in an axially middle part of the outer peripheral wall 2a, a side wall 2e at an end part of the outer peripheral wall 2a on the side opposite to the engine side, a boss part 2f extending from a center part of the side wall 2e toward the engine side, and a cylinder part 2g extending from an inner peripheral side end part of the second middle wall 2c toward the side opposite to the engine side.

The four planetary gear sets 11 to 14 are disposed in the order of, from the engine side, the first planetary gear set 11, the second planetary gear set 12 on an inner peripheral side and the third planetary gear set 13 on an outer peripheral side that are disposed to radially overlap to each other, and the fourth planetary gear set 14. The first planetary gear set 11 includes a carrier 11c, a pinion (not shown) supported by the carrier 11c, a sun gear 11s, and a ring gear 11r. The first planetary gear set 11 is of a single pinion type in which the pinion directly meshes with the sun gear 11s and the ring gear 11r. The second planetary gear set 12, the third planetary gear set 13, and the fourth planetary gear set 14 are also of a single pinion type, and include carriers 12c, 13c, and 14c, pinions (not shown), sun gears 12s, 13s, and 14s, and ring gears 12r, 13r, and 14r, respectively.

The ring gear 12r of the second planetary gear set 12 and the sun gear 13s of the third planetary gear set 13 that are disposed to radially overlap to each other are integrated by welding, shrink fitting, or the like. That is, the ring gear 12r and the sun gear 13s are always coupled to each other, thus forming an integral rotating element 15. The sun gear 11s of the first planetary gear set 11 is always coupled to the sun gear 12s of the second planetary gear set 12. The ring gear 11r of the first planetary gear set 11 is always coupled to the carrier 14c of the fourth planetary gear set 14. The carrier 11c of the first planetary gear set 11 is always coupled to the carrier 13c of the third planetary gear set 13. The input shaft 3 is always coupled to the carrier 12c of the second planetary gear set 12. The output gear 4 is always coupled to the carrier 11c of the first planetary gear set 11 and the carrier 13c of the third planetary gear set 13. The output gear 4 is rotatably supported via a bearing 41 by the cylinder part 2g of the transmission case 2.

A first rotating member 34 is coupled to the sun gear 14s of the fourth planetary gear set 14. The first rotating member 34 extends toward the side opposite to the engine side. Similarly, a second rotating member 35 is coupled to the ring gear 13r of the third planetary gear set 13. A third rotating member 36 is coupled to the integral rotating element 15. These rotating members 34 and 35 also extend toward the side opposite to the engine side. A fourth rotating member 37 is coupled via the input shaft 3 to the carrier 12c of the second planetary gear set 12.

The first brake 21 is disposed on the first middle wall 2b of the transmission case 2. The first brake 21 includes a cylinder 211, a piston 212 fitted into the cylinder 211, and an operation hydraulic chamber 213 defined by the cylinder 211 and the piston 212. As a predetermined fastening hydraulic pressure is supplied to the operation hydraulic chamber 213 in the first brake 21, a friction plate is fastened to fix the sun gear 11s of the first planetary gear set 11 and the sun gear 12s of the second planetary gear set 12 to the transmission case 2.

The second brake 22 is disposed on the third middle wall 2d. The second brake 22 includes a cylinder 23, a piston 24 fitted into the cylinder 23, and a fastening hydraulic chamber 26 defined by the cylinder 23 and the piston 24. As a predetermined fastening hydraulic pressure is supplied to the fastening hydraulic chamber 26 in the second brake 22, a friction plate is fastened to fix the ring gear 14r of the fourth planetary gear set 14 to the transmission case 2. The present embodiment shows an example of applying a friction fastening element including characteristics of the present invention to the second brake 22. The second brake 22 is described below in detail with reference to FIG. 3 and the following drawings.

The first to third clutches 31 to 33 are disposed at an end part within the transmission case 2 on the side opposite to the engine side. The first to third clutches 31 to 33 are disposed to radially overlap to each other in such a manner that at the axially same position, the second clutch 32 is placed on an inner peripheral side of the first clutch 31 and the third clutch 33 is placed on an inner peripheral side of the second clutch 32.

The first clutch 31 connects and disconnects the sun gear 14s of the fourth planetary gear set 14 to and from the ring gear 13r of the third planetary gear set 13. That is to say, the first clutch 31 switches a connection state of the first rotating member 34 coupled to the sun gear 14s and the second rotating member 35 coupled to the ring gear 13r.

The second clutch 32 connects and disconnects the sun gear 14s of the fourth planetary gear set 14 to and from the integral rotating element 15 (that is, the ring gear 12r of the second planetary gear set 12 and the sun gear 13s of the third planetary gear set 13). That is to say, the second clutch 32 switches a connection state of the first rotating member 34 coupled to the sun gear 14s and the third rotating member 36 coupled to the integral rotating element 15.

The third clutch 33 connects and disconnects the sun gear 14s of the fourth planetary gear set 14 to and from the input shaft 3 and the carrier 12c of the second planetary gear set 12. That is to say, the third clutch 33 switches a connection state of the first rotating member 34 coupled to the sun gear 14s and the fourth rotating member 37 coupled via the input shaft 3 to the carrier 12c.

The connection state of the first rotating member 34 to the second rotating member 35 is switched by the first clutch 31. The connection state of the first rotating member 34 to the third rotating member 36 is switched by the second clutch 32. The connection state of the first rotating member 34 to the fourth rotating member 37 is switched by the third clutch 33. That is, the first rotating member 34 is one rotating member of two rotating members whose connection state is switched by the clutches 31 to 33, which is common to the clutches. For this reason, a common rotating member 30 including a wall part perpendicular to a shaft center is disposed near the side wall 2e of the transmission case 2 on the side of the first to third clutches 31 to 33 opposite to the engine side. The first rotating member 34 is coupled to the common rotating member 30.

The common rotating member 30 is shared by the first to third clutches 31 to 33. Cylinders, pistons, operation hydraulic chambers, operation hydraulic pressure passages, centrifugal balance hydraulic chambers, centrifugal balance chamber components, and the like included in the clutches 31 to 33 are supported by the common rotating member 30. FIG. 1 schematically shows pistons 31p, 32p, and 33p of the first clutch 31, the second clutch 32, and the third clutch 33, respectively. A common member 38 that holds friction plates of the second clutch 32 and the third clutch 33 is attached to these clutches.

As described above, the automatic transmission 1 according to the present embodiment includes a transmission mechanism that includes the first to fourth planetary gear sets 11 to 14, and the first and second brakes 21 and 22 and the first to third clutches 31 to 33 that function as five friction fastening elements. In addition, the transmission mechanism changes the transmission ratio of the input shaft 3 and the output gear 4. FIG. 2 is a fastening table of the five friction fastening elements included in the automatic transmission 1. As shown in the fastening table of FIG. 2, three friction fastening elements of the five friction fastening elements are selectively fastened (the symbol ○ is given to the three friction fastening elements), it is possible to shift to first to eighth forward gears and a back gear. Referring to FIG. 2, CL1, CL2, and CL3 denote the first clutch 31, the second clutch 32, and the third clutch 33, respectively. BR1 and BR2 denote the first brake 21 and the second brake 22, respectively.

[Details of Friction Fastening Element]

Figure 3:
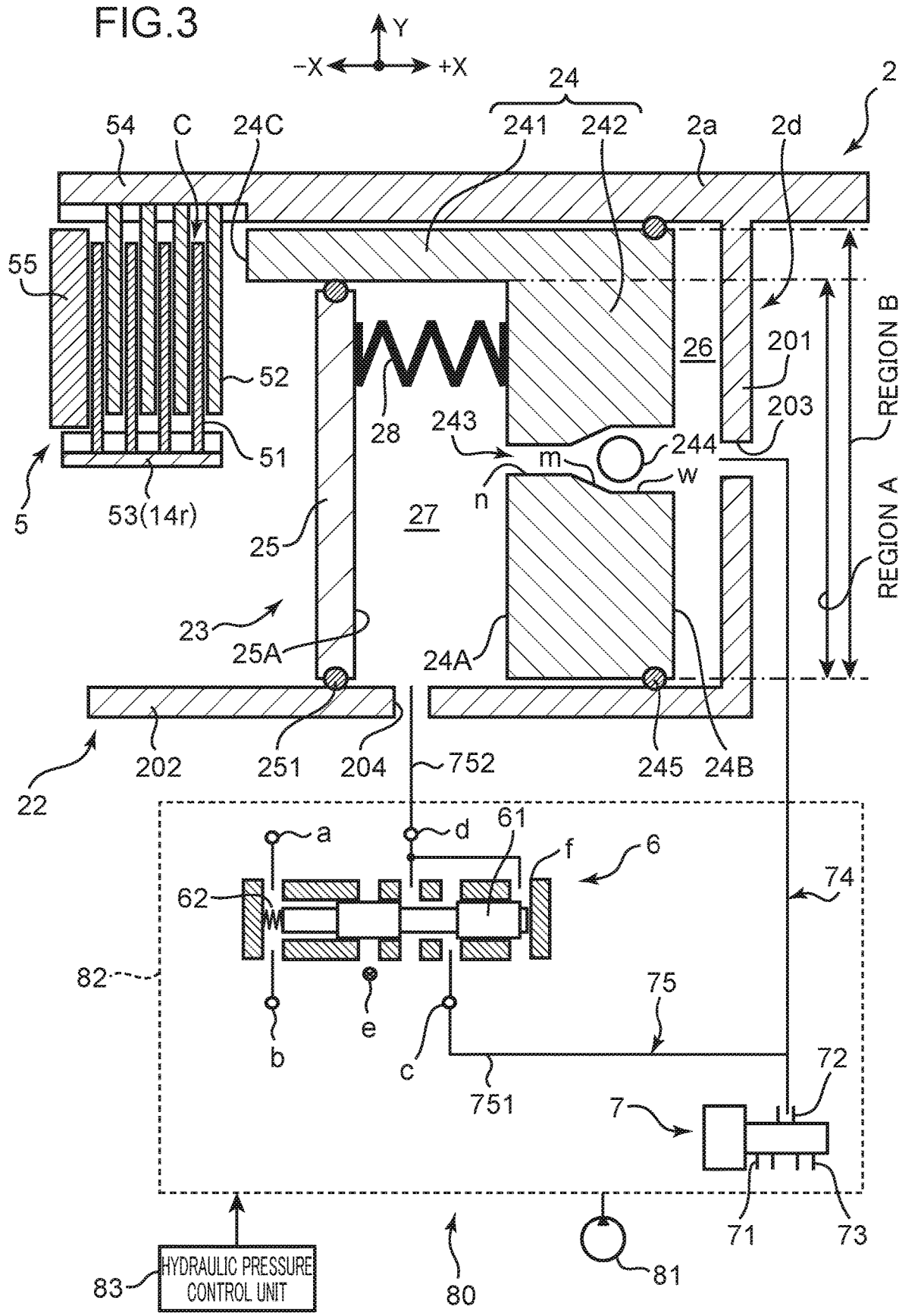
FIG. 3 shows a schematic cross-section of a configuration of one of the friction fastening elements, that is, a brake according to the embodiment of the present invention and a block configuration of a hydraulic mechanism of the brake.

FIG. 3 shows a schematic cross-section of a configuration of a friction fastening element of the automatic transmission 1 according to the embodiment of the present invention and a block configuration of a hydraulic mechanism of the friction fastening element. An example of applying the friction fastening element to the second brake 22 is shown herein. In FIG. 3 (and FIGS. 4 to 8 below), the axial direction of the input shaft 3 is an X direction and the radial direction of the automatic transmission 1 is a Y direction. Regarding the X direction, for convenience, the left side on the drawing is denoted by −X and the right side on the drawing in the X direction is denoted by +X.

The second brake 22 is, as described above, a friction fastening element that is disposed in the cylinder 23 formed by the third middle wall 2d. The second brake 22 includes the piston 24, a sealing ring 25, a fastening hydraulic chamber 26, a release hydraulic chamber 27, a return spring 28, and a friction plate unit 5 (a plurality of friction plates). A hydraulic mechanism 80 is provided for the second brake 22. The hydraulic mechanism 80 includes an oil pump 81, a hydraulic circuit 82 including a reducing valve 6 and a linear solenoid valve 7 (hydraulic pressure control valve), and a hydraulic pressure control unit 83 that controls the oil pump 81 and the hydraulic circuit 82.

The third middle wall 2d is constituted by a first wall part 201 extending radially inward from the outer peripheral wall 2a of the transmission case 2 and a second wall part 202 extending axially (in the −X direction) from a radially inward edge of the first wall part 201. The outer peripheral wall 2a and the second wall part 202 radially oppose to each other with a predetermined distance therebetween. The space formed by the outer peripheral wall 2a, the first wall part 201, and the second wall part 202 constitutes the space for the above-described cylinder 23 in the second brake 22. The first wall part 201 is provided with a first supply port 203 for supplying a hydraulic pressure to the fastening hydraulic chamber 26. The second wall part 202 is provided with a second supply port 204 for supplying a hydraulic pressure to the release hydraulic chamber 27.

The piston 24 includes a first surface 24A and a second surface 24B axially opposing to each other, and is capable of axially moving in the space between the outer peripheral wall 2a and the second wall part 202 (in the cylinder 23). The first surface 24A faces the release hydraulic chamber 27 and the second surface 24B faces the fastening hydraulic chamber 26. The piston 24 is moved between a release position where the friction plate unit 5 is released (for example, a position shown in FIG. 4) and a fastening position where pressing force is applied to the friction plate unit 5 to fasten the friction plate unit 5 (a position shown in FIG. 8).

The piston 24 includes a pressing piece 241 adjacent to the outer peripheral wall 2a and a pressure-receiving piece 242 that is slidably in contact with inner peripheral surfaces of the outer peripheral wall 2a and the second wall part 202. A through-hole 243 axially passing through the pressure-receiving piece 242 is formed in the pressure-receiving piece 242. A sealing member 245 is fitted into inner and outer peripheral surfaces of the pressure-receiving piece 242.

The pressing piece 241 projects from the pressure-receiving piece 242 toward the −X side, and includes a distal end surface 24C applying pressing force to the friction plate unit 5 on a distal end side (the −X side) in its movement direction. The pressure-receiving piece 242 is a partition wall that defines the fastening hydraulic chamber 26 and the release hydraulic chamber 27. In the present embodiment, the fastening hydraulic chamber 26 may communicate with the release hydraulic chamber 27 via the through-hole 243. The sealing member 245 allows the axial movement of the piston 24 and at the same time, seals the gap between the inner peripheral surface of the pressure-receiving piece 242 and the inner peripheral surface of the second wall part 202 and the gap between the outer peripheral surface of the pressure-receiving piece 242 and the inner peripheral surface of the outer peripheral wall 2a.

The through-hole 243 is a cylindrical hole with different diameters in the axial direction, and includes a large-diameter part w with a relatively large diameter, a small-diameter part n with a relatively small diameter, and a middle part m between the large-diameter part w and the small-diameter part n. The large-diameter part w is disposed near the second surface 24B of the pressure-receiving piece 242, that is, on a side of the fastening hydraulic chamber 26. The small-diameter part n is disposed near the first surface 24A, that is, on a side of the release hydraulic chamber 27. The middle part m is a tapered part that gradually reduces its inner diameter from the large-diameter part w toward the small-diameter part n.

A pressure ball 244 (regulation part) is disposed in the through-hole 243 for the purpose of regulating an oil flow from the fastening hydraulic chamber 26 to the release hydraulic chamber 27. The pressure ball 244 has an outer diameter that is smaller than an inner diameter of the large-diameter part w and is larger than an inner diameter of the small-diameter part n. If the hydraulic pressure of the release hydraulic chamber 27 is higher than the hydraulic pressure of the fastening hydraulic chamber 26, the pressure ball 244 floats in the large-diameter part w and does not regulate the oil flow from the fastening hydraulic chamber 26 to the release hydraulic chamber 27. On the other hand, if the hydraulic pressure of the fastening hydraulic chamber 26 is higher than the hydraulic pressure of the release hydraulic chamber 27, the pressure ball 244 is locked to the middle part m to close the through-hole 243.

The sealing ring 25 is a ring-shaped plate member that is disposed on a side of the first surface 24A of the piston 24 to face the pressure-receiving piece 242. The sealing ring 25 is disposed between the pressing piece 241 of the piston 24 and the second wall part 202 and defines the release hydraulic chamber 27 with the pressing piece 241 and the second wall part 202. A sealing member 251 is attached to inner and outer peripheral surfaces of the sealing ring 25. The sealing member 251 seals the gap between an outer peripheral edge of the sealing ring 25 and the inner peripheral surface of the pressing piece 241 and the gap between the inner peripheral surface of the sealing ring 25 and the inner peripheral surface of the second wall part 202.

The fastening hydraulic chamber 26 is the space to which a hydraulic pressure for moving the piston 24 in a direction toward the fastening position (in the −X direction) is supplied. The fastening hydraulic chamber 26 is the space defined by the first wall part 201, the second wall part 202, the outer peripheral wall 2a, and the second surface 24B of the piston 24. That is, the fastening hydraulic chamber 26 applies the hydraulic pressure to the second surface 24B to move the piston 24 to the fastening position where the friction plate unit 5 is pressed to be fastened (friction plates are fastened).

The release hydraulic chamber 27 is the space to which a hydraulic pressure for moving the piston 24 in a direction toward the release position (in the +X direction) is supplied. The release hydraulic chamber 27 is the space defined by the second wall part 202, the pressing piece 241 of the piston 24, a surface of the sealing ring 25 on the +X side, and the first surface 24A of the piston 24. That is, the release hydraulic chamber 27 applies the hydraulic pressure to the first surface 24A to move the piston 24 to the release position where the friction plate unit 5 is released. The return spring 28 that biases the piston 24 in the +X direction is disposed in the release hydraulic chamber 27. When no hydraulic pressure is applied to the fastening hydraulic chamber 26, the return spring 28 moves (returns) the piston 24 in the +X direction.

The hydraulic-pressure-receiving area of the second surface 24B of the piston 24 is set to be larger than the hydraulic-pressure-receiving area of the first surface 24A of the piston 24. Referring to FIG. 3, the region on the first surface 24A to which a hydraulic pressure from the release hydraulic chamber 27 is applied, that is, the pressure-receiving area of the first surface 24A is schematically shown as "region A". The region on the second surface 24B to which a hydraulic pressure from the fastening hydraulic chamber 26 is applied, that is, the pressure-receiving area of the second surface 24B is schematically shown as "region B". In the present embodiment, the relationship between these pressure-receiving areas is represented as region B>region A.

There is a difference in the pressure-receiving area between the region A and the region B, and thus the piston 24 can be moved based on the difference in the pressure-receiving area. That is, when the same hydraulic pressure is simultaneously supplied to the fastening hydraulic chamber 26 and the release hydraulic chamber 27, the first surface 24A and the second surface 24B receive this hydraulic pressure. In this case, the pressure-receiving area of the second surface 24B is larger than the pressure-receiving area of the first surface 24A, and thus pressing force in the −X direction acts on the piston 24 according to the difference in the pressure-receiving area. The through-hole 243 is formed in the piston 24. Consequently, when the pressing force acts in the −X direction, oil in the release hydraulic chamber 27 flows via the through-hole 243 into the fastening hydraulic chamber 26. The piston 24 is thus moved in the −X direction. That is, the pressing force in the +X direction, which is received by the first surface 24A, and the pressing force in the −X direction, which is received by the second surface 24B, are offset, and thus the piston 24 is moved in the −X direction based on the pressing force corresponding to the difference in the pressure-receiving area.

The friction plate unit 5 includes a plurality of friction plates disposed with a clearance therebetween, and is disposed on the side of the first surface 24A of the piston 24. Specifically, the friction plate unit 5 is configured such that a plurality of drive plates 51 and a plurality of driven plates 52 are alternately arranged with a predetermined clearance C therebetween. A facing is applied on both surfaces of the drive plate 51. The drive plates 51 are spline-coupled to a first spline part 53. The driven plates 52 are spline-coupled to a second spline part 54. The first spline part 53 corresponds to the outer peripheral part of the ring gear 14r of the fourth planetary gear set 14 shown in FIG. 1. The second spline part 54 is provided in a part of the outer peripheral wall 2a of the transmission case 2.

The distal end surface 24C of the piston 24 abuts against the driven plate 52 placed closest to the +X side and applies pressing force to the friction plate unit 5. A retaining plate 55 is disposed adjacent to the drive plate 51 placed closest to the −X side. The retaining plate 55 regulates the movement of the drive plates 51 and the driven plates 52 in the −X direction.

The hydraulic mechanism 80 supplies a predetermined hydraulic pressure to the friction fastening elements included in the automatic transmission 1 and discharges the predetermined hydraulic pressure. The oil pump 81 of the hydraulic mechanism 80 is driven by the engine to cause oil to flow into required portions and generates a predetermined hydraulic pressure. The hydraulic circuit 82 selectively supplies a hydraulic pressure to the first brake 21, the second brake 22, and the first to third clutches 31 to 33 that function as the friction fastening elements to shift to the transmission gears shown in FIG. 2. FIG. 3 shows only the reducing valve 6 and the linear solenoid valve 7 for supplying and discharging a hydraulic pressure to and from the second brake 22.

The linear solenoid valve 7 is a hydraulic pressure control valve that supplies and discharges a hydraulic pressure to and from the fastening hydraulic chamber 26 and the release hydraulic chamber 27. The linear solenoid valve 7 includes an input port 71 to which oil is introduced from the oil pump 81, an output port 72 that outputs the oil (the hydraulic pressure), a drain port 73 that discharges the oil, and a spool (not shown) operated by a coil being energized. When the hydraulic pressure is supplied to the fastening hydraulic chamber 26 and the release hydraulic chamber 27, the spool is operated to allow the input port 71 to communicate with the output port 72. When the oil is discharged, the output port 72 communicates with the drain port 73. As the amount of energization to the coil in the linear solenoid valve 7 is controlled, the amount of oil discharged from the output port 72 is controlled.

The hydraulic circuit 82 includes a first oil passage 74 for allowing the linear solenoid valve 7 to communicate with the fastening hydraulic chamber 26 and a second oil passage 75 for allowing the linear solenoid valve 7 to communicate with the release hydraulic chamber 27. Specifically, an upstream end of the first oil passage 74 is connected to the output port 72 whereas a downstream end thereof is connected to the first supply port 203 communicating with the fastening hydraulic chamber 26. An upstream end of the second oil passage 75 is connected to the output port 72 whereas a downstream end thereof is connected to the second supply port 204 communicating with the release hydraulic chamber 27. That is, the first oil passage 74 and the second oil passage 75 do not receive oil supplied from different hydraulic pressure supply passages. Instead, the first oil passage 74 and the second oil passage 75 receive oil from the output port 72 of the linear solenoid valve 7 that is common to the first oil passage 74 and the second oil passage 75.

The second oil passage 75 is divided into an upstream oil passage 751 and a downstream oil passage 752 with the below-described reducing valve 6 interposed therebetween. When the friction plate unit 5 is shifted from the released state to the fastened state, a hydraulic pressure is simultaneously supplied from the output port 72 of the linear solenoid valve 7 through the first oil passage 74 and the second oil passage 75 to the fastening hydraulic chamber 26 and the release hydraulic chamber 27.

The reducing valve 6 is attached to the second oil passage 75 and regulates the hydraulic pressure of the release hydraulic chamber 27 so as not to exceed a predetermined hydraulic pressure. The reducing valve 6 includes a plurality of ports a, b, c, d, e, and f, and a spool 61 that switches the ports. The ports a and b communicate with a spring chamber in which a return spring 62 biasing the spool 61 in the +X direction is accommodated. The port c is an input port c, and the port d is an output port d. A downstream end of the upstream oil passage 751 of the second oil passage 75 is connected to the input port c. An upstream end of the downstream oil passage 752 is connected to the output port d, and thus the output port d is connected to the second supply port 204.

The port e is a drain port e, and the port f is a feedback port f. When the biasing force of the return spring 62 is larger than the hydraulic pressure input to the feedback port f, the input port c communicates with the output port d. The upstream oil passage 751 thus communicates with the downstream oil passage 752, so that the hydraulic pressure can be supplied to the release hydraulic chamber 27. Meanwhile, when the hydraulic pressure exceeding the biasing force of the return spring 62 is input to the feedback port f, the spool 61 is moved in the −X direction by the hydraulic pressure and the output port d communicates with the drain port e. The hydraulic pressure can thus be discharged from the release hydraulic chamber 27. That is, if the hydraulic pressure of the release hydraulic chamber 27 is increased, the hydraulic pressure supplied from the feedback port f to the reducing valve 6 is also increased. The spool 61 is then operated to allow the output port d to communicate with the drain port e, thus reducing the hydraulic pressure of the release hydraulic chamber 27. When the hydraulic pressure is reduced and the biasing force of the return spring 62 becomes larger, the spool 61 returns to allow the input port c to communicate with the output port d, and thus the hydraulic pressure can be supplied to the release hydraulic chamber 27.

The hydraulic pressure control unit 83 controls an operation of a solenoid of the linear solenoid valve 7, thus controlling the hydraulic pressure supplied to the fastening hydraulic chamber 26 and the release hydraulic chamber 27. In addition, the hydraulic pressure control unit 83 controls solenoid valves of other friction fastening elements and the like, and also controls the hydraulic pressure supplied to the first brake 21 and the first to third clutches 31 to 33.

[Operation of Friction Fastening Element]

Figure 4:
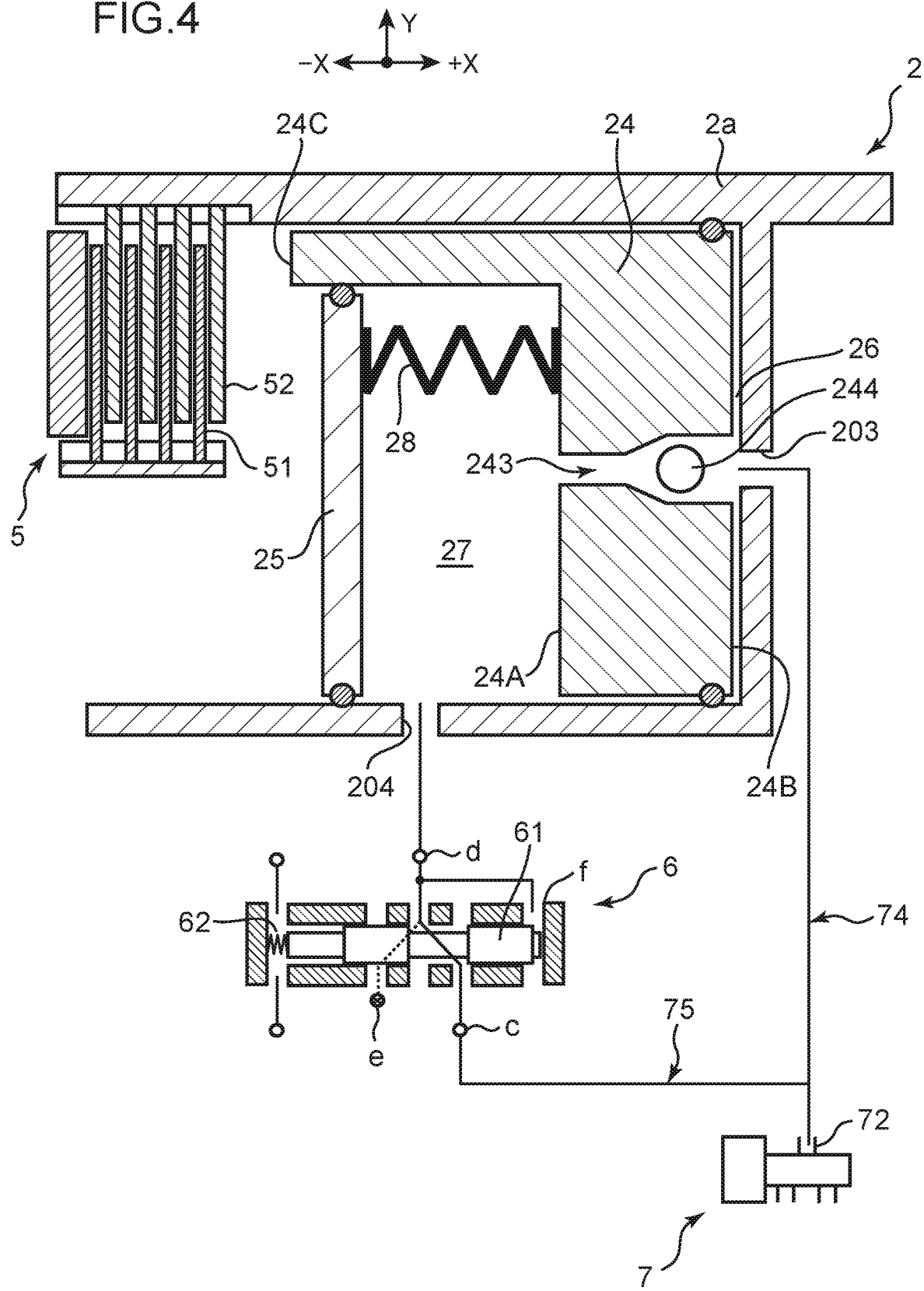
FIG. 4 is a schematic cross-sectional view for explaining an operation of the brake.

Next, an operation of the second brake 22 shown in FIG. 3 is described with reference to the schematic cross-sectional views shown in FIGS. 4 to 8. FIG. 4 shows a wait state where no hydraulic pressure is supplied via the linear solenoid valve 7 to the fastening hydraulic chamber 26 and the release hydraulic chamber 27. The piston 24 is pressed in the +X direction by the biasing force of the return spring 28 without being affected by a hydraulic pressure, thus being located at the release position. The distal end surface 24C of the piston 24 is spaced apart from the friction plate unit 5 by a predetermined distance, and the drive plates 51 and the driven plates 52 in the friction plate unit 5 are released. As the piston 24 is moved in the +X direction, the capacity of the fastening hydraulic chamber 26 is minimized and on the other hand, the capacity of the release hydraulic chamber 27 is maximized.

Figure 5:
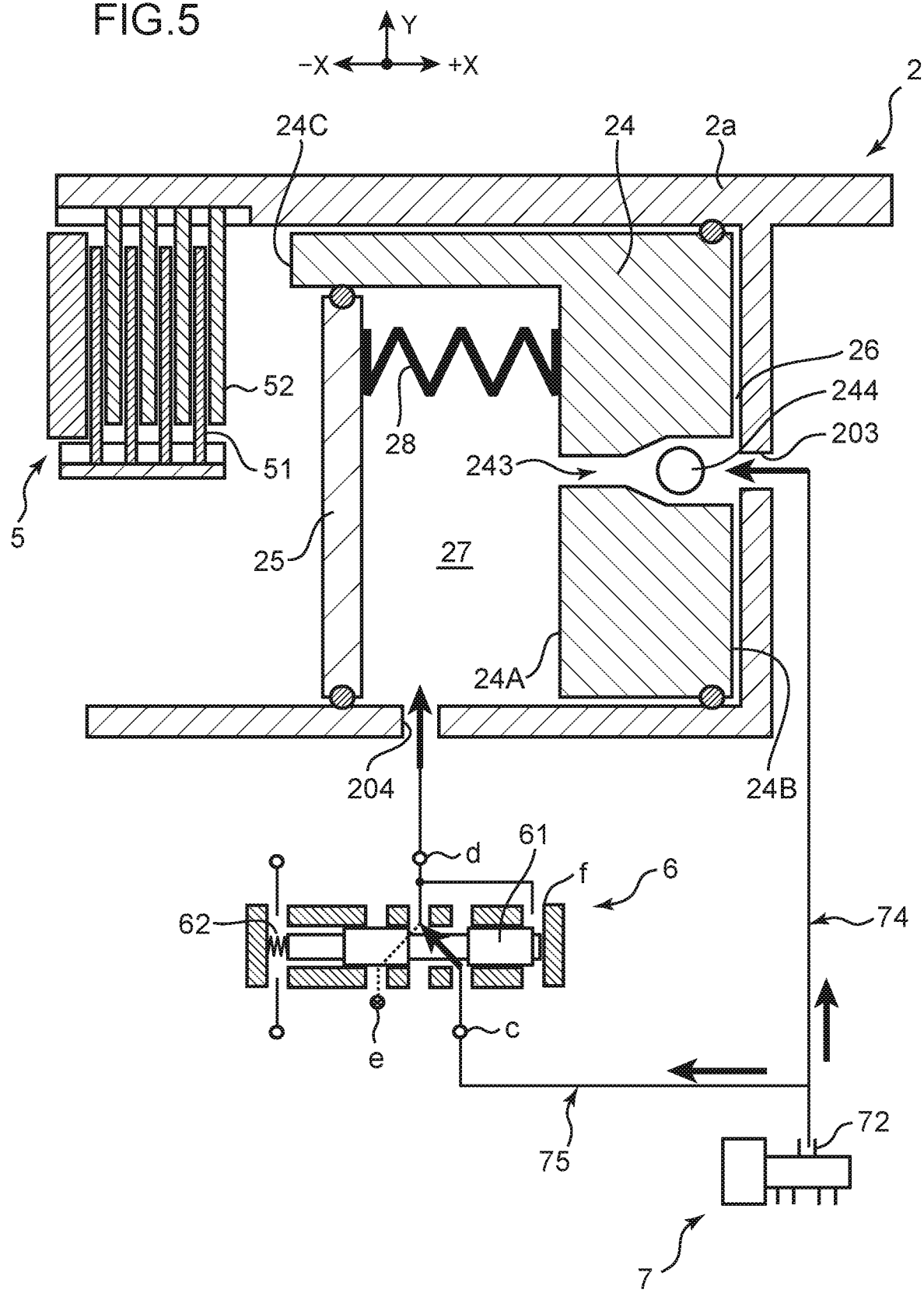
FIG. 5 is a schematic cross-sectional view for explaining the operation of the brake.

FIG. 5 shows a state, after the wait state of FIG. 4, where oil starts to flow into the fastening hydraulic chamber 26 and the release hydraulic chamber 27. The hydraulic pressure control unit 83 allows the input port 71 of the linear solenoid valve 7 to communicate with the output port 72 thereof, thus executing control such that the oil discharged from the oil pump 81 flows in the first oil passage 74 and the second oil passage 75. In the reducing valve 6, the input port c communicates with the output port d by the biasing force of the return spring 62. The oil starts to flow from the output port 72 of the linear solenoid valve 7, which is common to the first oil passage 74 and the second oil passage 75, through the first oil passage 74 to the fastening hydraulic chamber 26 and at the same time, to flow from the output port 72 through the upstream oil passage 751, the reducing valve 6, and the downstream oil passage 752 of the second oil passage 75 to the release hydraulic chamber 27. In such a state, the pressing force by a hydraulic pressure does not, of course, act on the piston 24. The piston 24 is thus completely moved in the +X direction by the biasing force of the return spring 28.

Figure 6:
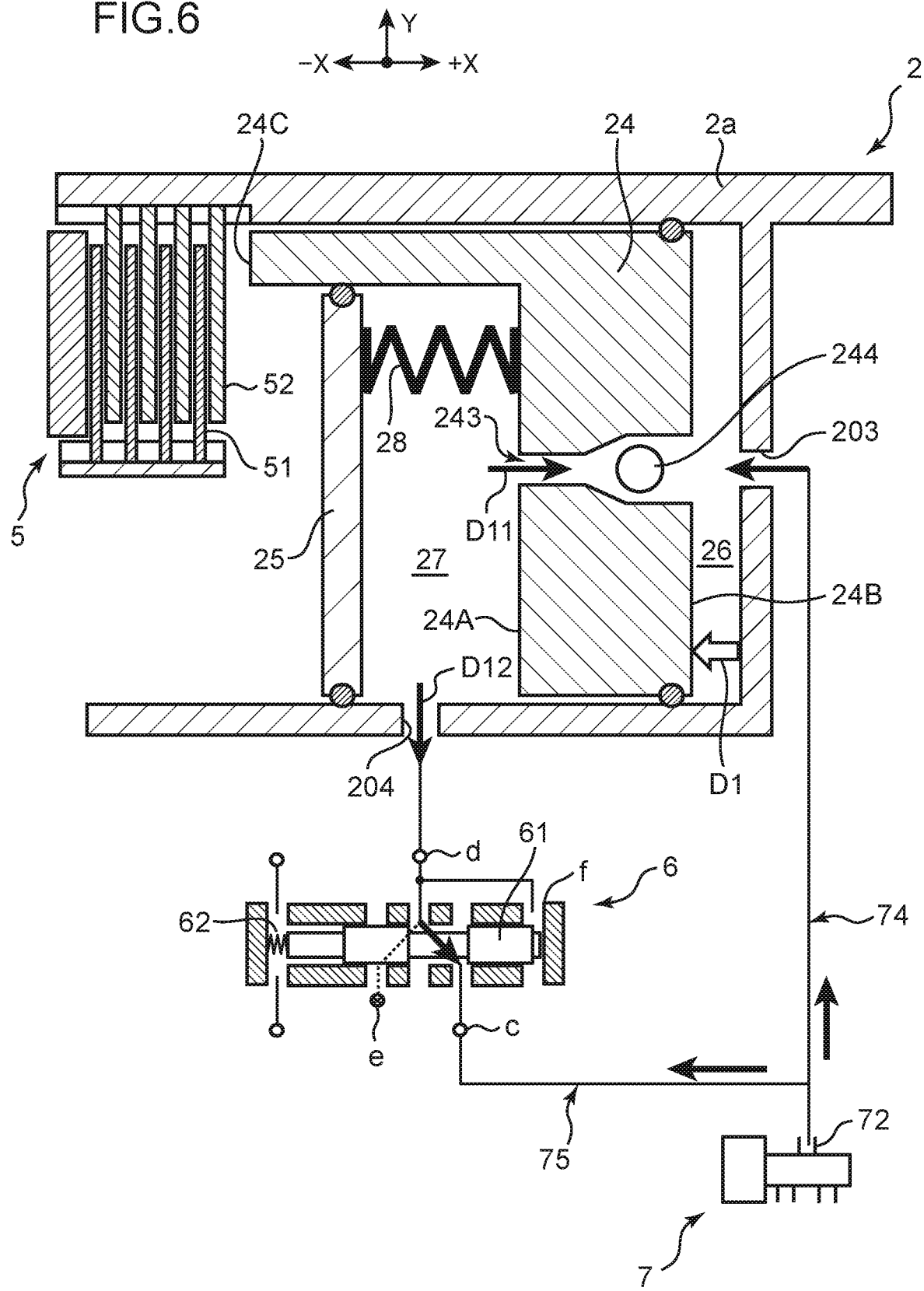
FIG. 6 is a schematic cross-sectional view for explaining the operation of the brake.

FIG. 6 shows a state where after oil starts to flow as shown in FIG. 5, the fastening hydraulic chamber 26 and the release hydraulic chamber 27 are filled with the oil and thus the piston 24 is moved in the −X direction. When the same hydraulic pressure is applied to the fastening hydraulic chamber 26 and the release hydraulic chamber 27, the piston 24 is moved based on a difference in the pressure-receiving area between the first surface 24A and the second surface 24B. As described above, the pressure-receiving area of the second surface 24B is larger than the pressure-receiving area of the first surface 24A, and thus pressing force D1 in the −X direction acts on the piston 24 based on the difference in the pressure-receiving area. That is, pressing force D1=hydraulic pressure×(area of region B−area of region A). The pressing force D1 moves the piston 24 in the −X direction. The pressing force D1 needs to exceed the biasing force of the return spring 28 in the +X direction. For this reason, the difference in the pressure-receiving area is set in view of the biasing force of the return spring 28.

When the piston 24 is moved in the −X direction, the hydraulic pressure of the release hydraulic chamber 27 is increased. In addition, the release hydraulic chamber 27 has large capacity when the piston 24 is moved in the +X direction. Consequently, a large amount of oil is present in the release hydraulic chamber 27. As shown by an arrow D11 in FIG. 6, the oil in the release hydraulic chamber 27 flows via the through-hole 243 into the fastening hydraulic chamber 26. The oil may flow reversely in the second oil passage 75, as shown by an arrow D12, depending on the hydraulic pressure of the release hydraulic chamber 27.

As described above, the fastening hydraulic chamber 26 receives the oil from the release hydraulic chamber 27 and thus it requires only a small amount of oil to be supplied through the first oil passage 74 to the fastening hydraulic chamber 26. That is, it is only required that a flow rate of oil for generating the pressing force D1 based on the difference in the pressure-receiving area is supplied via the linear solenoid valve 7. The hydraulic pressure response in moving the piston 24 in the −X direction is thus improved. In response to the movement of the piston 24, the distal end surface 24C approaches the friction plate unit 5 and the return spring 28 is gradually compressed.

Figure 7:
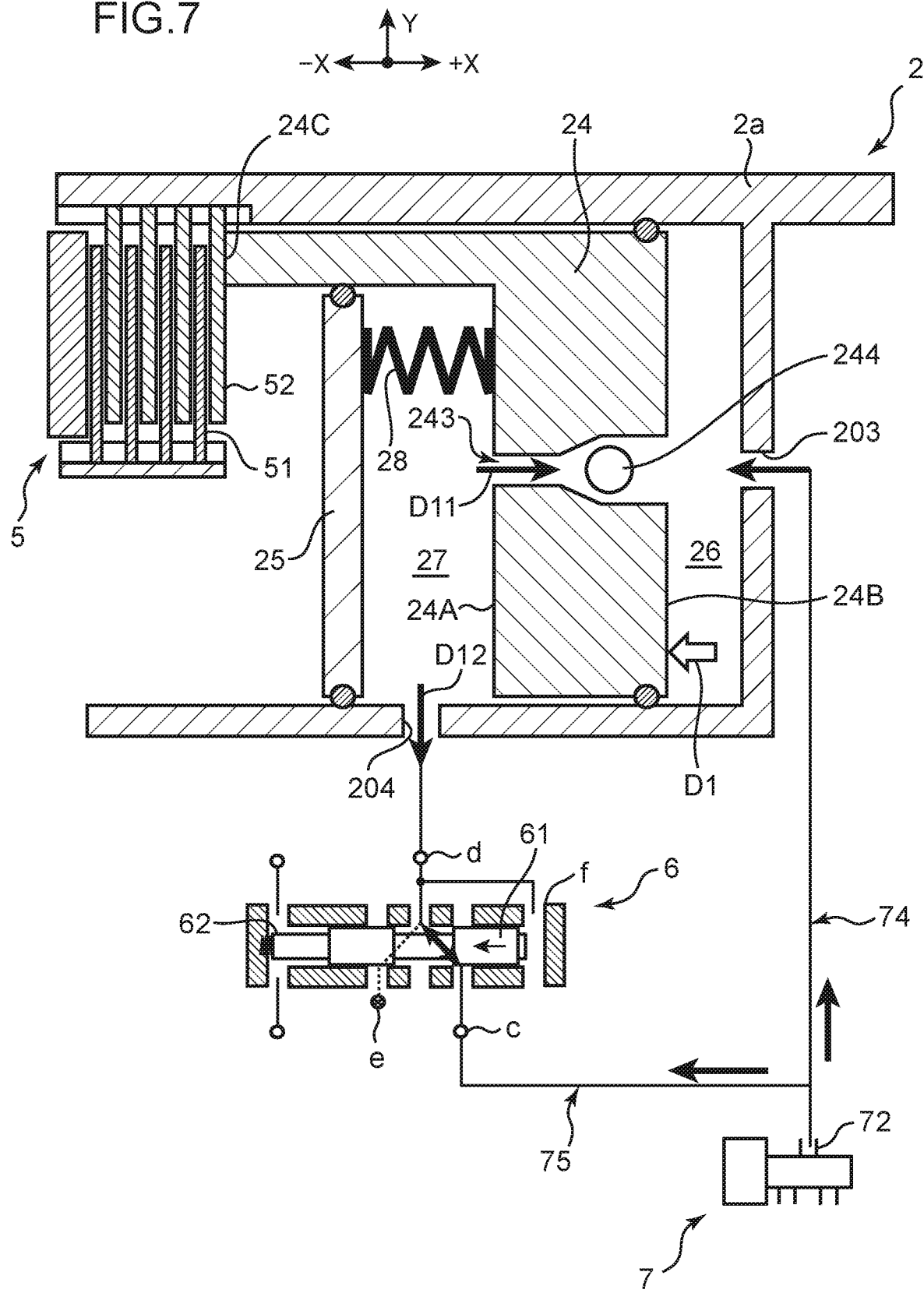
FIG. 7 is a schematic cross-sectional view for explaining the operation of the brake.

FIG. 7 shows a state where a stroke of the piston 24 is completed. In such a state, the piston 24 is moved in the −X direction and thus the distal end surface 24C reaches a position (fastening position) of abutting against the friction plate unit 5 (the driven plate 52). Even in this state, as described in FIG. 6, only the pressing force D1 based on the difference in the pressure-receiving area acts on the second surface 24B, and oil flows as shown by the arrows D11 and D12.

When the distal end surface 24C abuts against the friction plate unit 5 and the piston 24 presses the friction plate unit 5, a clearance between the drive plate 51 and the driven plate 52 is reduced and friction fastening force is generated therebetween. At this time, only the pressing force D1 still contributes to pressing. In initial fastening, the drive plate 51 and the driven plate 52 are fastened at a low fastening pressure. This contributes to a reduction in fastening shock in the friction plate unit 5.

Figure 8:
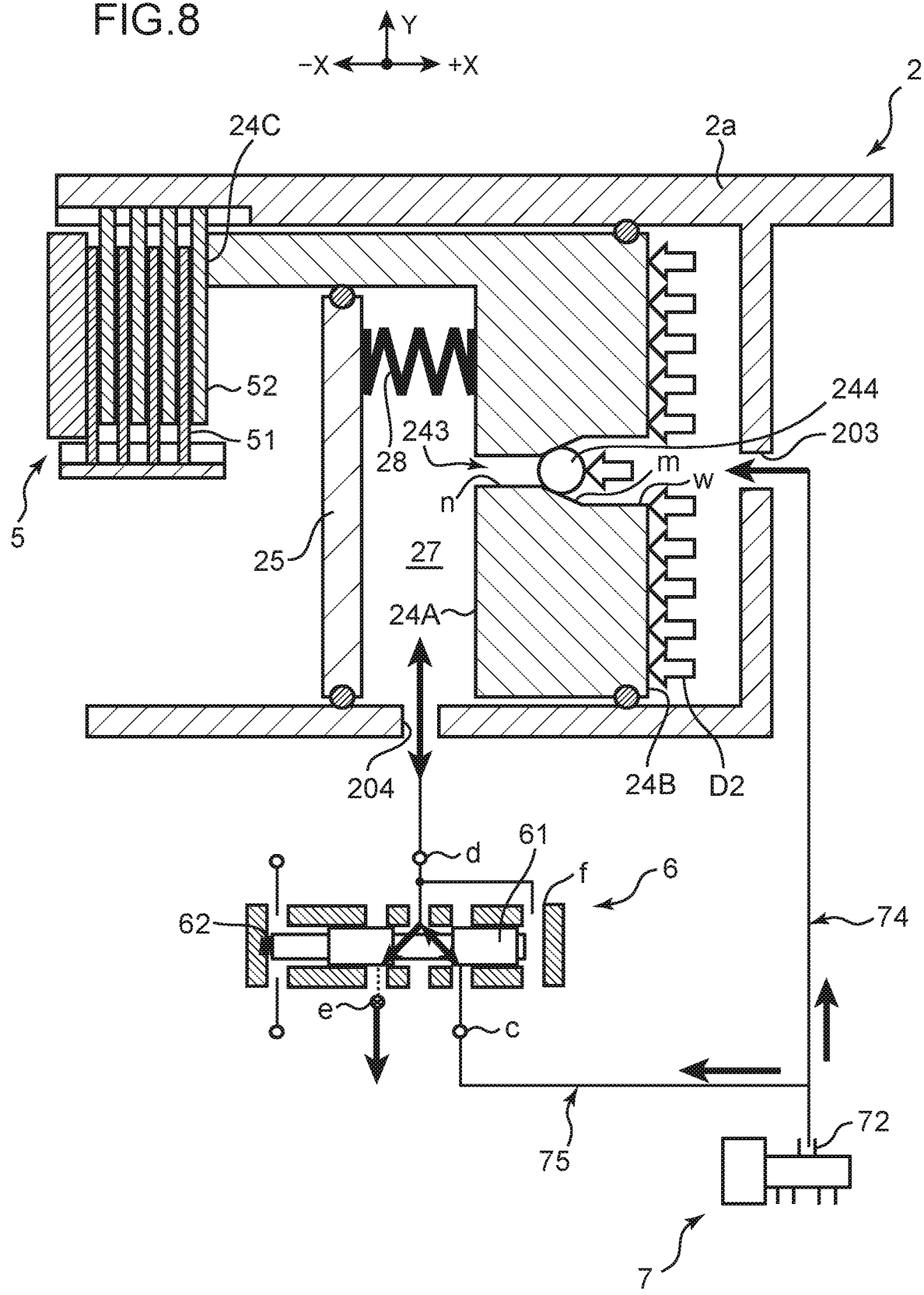
FIG. 8 is a schematic cross-sectional view for explaining the operation of the brake.

FIG. 8 shows a state where the friction plate unit 5 is fastened at a predetermined fastening pressure. In such a state, the hydraulic pressure control unit 83 controls the linear solenoid valve 7 to supply a predetermined fastening hydraulic pressure (a line pressure) from the output port 72. The fastening hydraulic pressure is thus applied through the first oil passage 74 and the second oil passage 75 to the fastening hydraulic chamber 26 and the release hydraulic chamber 27, respectively. However, the reducing valve 6 is operated to regulate the hydraulic pressure of the release hydraulic chamber 27 not so as to exceed a predetermined pressure (a predetermined hydraulic pressure lower than the fastening hydraulic pressure). That is, when the hydraulic pressure of the release hydraulic chamber 27 is increased and the hydraulic pressure exceeding the biasing force of the return spring 62 is input to the feedback port f of the reducing valve 6, the spool 61 is moved in the −X direction by the hydraulic pressure and the output port d communicates with the drain port e. The hydraulic pressure of the release hydraulic chamber 27 is thus kept at a constant pressure. Consequently, only the hydraulic pressure of the fastening hydraulic chamber 26 is increased.

As the hydraulic pressure of the fastening hydraulic chamber 26 is increased, the pressure ball 244 is moved in the −X direction to close the through-hole 243. The movement of oil from the fastening hydraulic chamber 26 to the release hydraulic chamber 27 is regulated. Large pressing force D2 in the −X direction thus acts on the piston 24 based on the fastening hydraulic pressure. Pressing force D2=fastening hydraulic pressure×area of region B. That is, the pressing force D2 corresponding to the fastening hydraulic pressure is applied to the overall second surface 24B and thus the piston 24 is pressed in the −X direction. The pressing force D2 is applied via the distal end surface 24C to the friction plate unit 5. The friction plate unit 5 is thus fastened at a predetermined brake fastening pressure.

[Change in Fastening Pressure Before and after Pressure Regulation]

Figure 9:
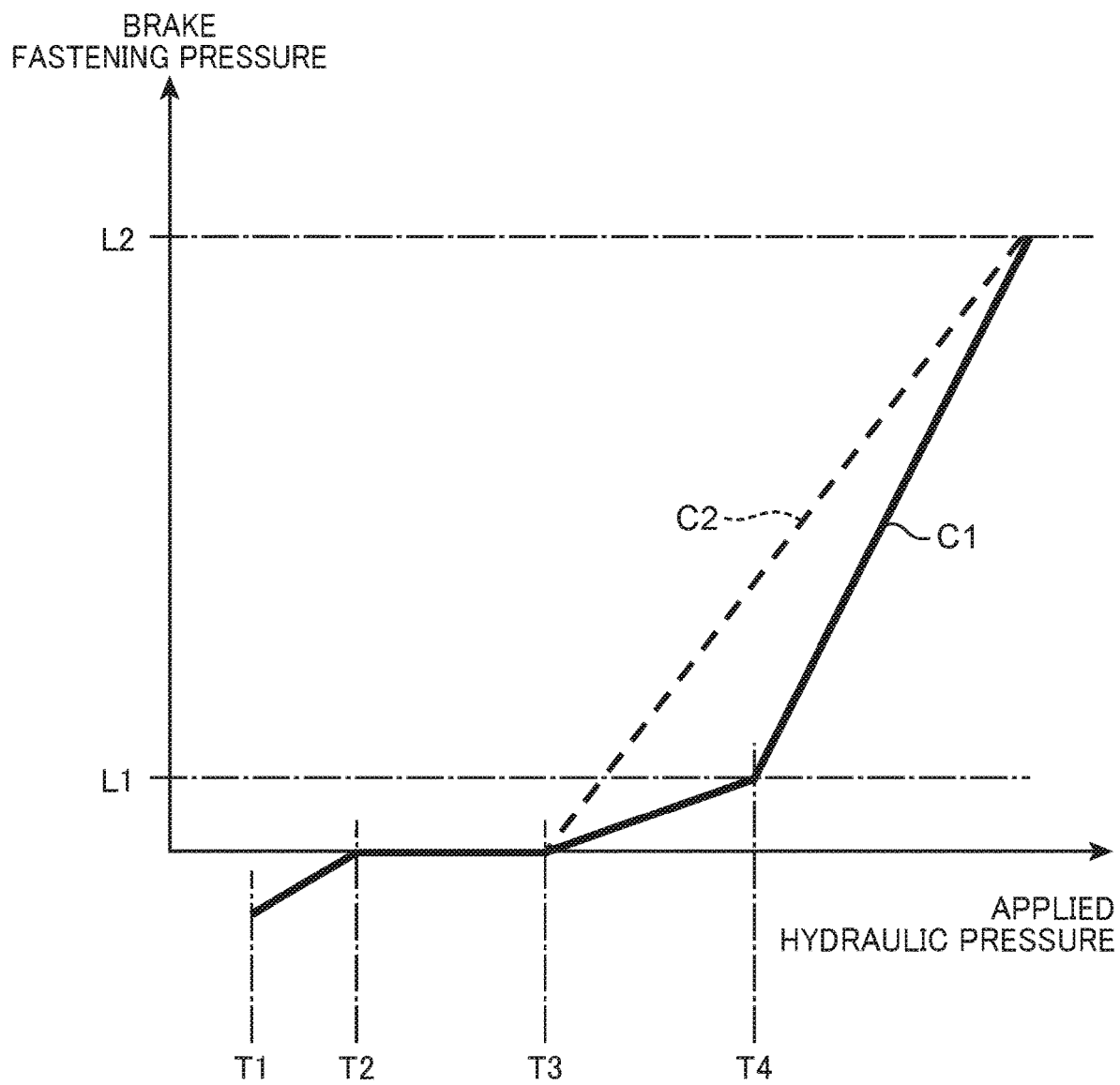
FIG. 9 is a graph showing a relationship between an applied hydraulic pressure and a change in brake fastening pressure.

FIG. 9 is a graph showing a relationship between a hydraulic pressure applied to the fastening hydraulic chamber 26 and the release hydraulic chamber 27 and a change in the brake fastening pressure of the second brake 22. In the brake fastening pressure on the vertical axis, a level L1 indicates a level at which the reducing valve 6 starts to be operated and a level L2 indicates a level at which a predetermined fastening hydraulic pressure is applied. Further referring to FIG. 9, a solid line C1 indicates a fastening pressure change characteristic according to the present embodiment and a dot line C2 indicates a fastening pressure change characteristic according to a comparative example.

At a time point T1, no oil is filled in the fastening hydraulic chamber 26 and the release hydraulic chamber 27. The time point T1 corresponds to the wait state described with reference to FIG. 4 or the state of FIG. 5 where oil starts to flow in the fastening hydraulic chamber 26 and the release hydraulic chamber 27. As shown in FIGS. 4 and 5, the piston 24 is pressed in the +X direction by the biasing force of the return spring 28, thus being located at the release position.

The time point T2 is a timing when the oil is filled in the fastening hydraulic chamber 26 and the release hydraulic chamber 27 and the piston 24 starts to be moved in the −X direction based on a difference in the pressure-receiving area between the first surface 24A and the second surface 24B. A time point T3 is a timing when the piston 24 is completely moved in the −X direction, the distal end surface 24C abuts against the friction plate unit 5, and the clearance C between the plates 51 and 52 is reduced (a so-called zero-touch state). FIG. 6 shows the state of the piston 24 between the time point T2 and the time point T3. During the period between the time point T2 and the time point T3, the piston 24 does not abut against the friction plate unit 5. A brake fastening pressure is thus not generated.

After the time point T3, the brake fastening pressure is generated. In the present embodiment, however, in initial fastening after the time point T3, the brake fastening pressure is not increased sharply. This is because, as shown in FIG. 7, after a stroke of the piston 24 is completed, the piston 24 is still moved, for a while, based on the difference in the pressure-receiving area between the first surface 24A and the second surface 24B and thus only small pressing force D1 is applied to the friction plate unit 5.

A time point T4 is a timing when the hydraulic pressure of the fastening hydraulic chamber 26 and the release hydraulic chamber 27 is higher than a predetermined pressure and the reducing valve 6 starts to be operated (brake fastening pressure=L1). As described with reference to FIG. 8, when the reducing valve 6 is operated, the hydraulic pressure of the release hydraulic chamber 27 is regulated to a constant pressure and thus large pressing force D2 in the −X direction acts on the piston 24. Consequently, the friction plate unit 5 also receives large pressing force and thus the brake fastening pressure is increased greatly.

As described above, during the period from the time point T3 when the friction plate unit 5 is fastened to the time point T4 when the reducing valve 6 is operated, the piston 24 is moved based on the difference in the pressure-receiving area between the first surface 24A and the second surface 24B. After the time point T4, the piston 24 is moved by the increased pressure of the fastening hydraulic chamber 26. As shown by the solid line C1, the brake fastening pressure is increased moderately from the time point T3 to the time point T4, and is then increased sharply after the time point T4. Thus, a fastening shock in initial fastening of the friction plate unit 5 is reduced. Meanwhile, if it depends only on the increased pressure of the fastening hydraulic chamber 26 in the initial fastening, as shown by the dot line C2, the brake fastening pressure is increased sharply after the time point T3. Thus, a relatively large fastening shock may be generated.

[Operations and Effects]

The friction fastening element or the automatic transmission 1 according to the present embodiment as described above achieves the following operations and effects. The automatic transmission 1 includes the linear solenoid valve 7 shared by the fastening hydraulic chamber 26 and the release hydraulic chamber 27. Specifically, the automatic transmission 1 includes the first oil passage 74 for allowing the output port 72 of the linear solenoid valve 7 to communicate with the fastening hydraulic chamber 26 and the second oil passage 75 for allowing the output port 72 to communicate with the release hydraulic chamber 27. When the friction plate unit 5 is shifted from the released state to the fastened state, a hydraulic pressure is simultaneously supplied from the output port 72 through the first oil passage 74 and the second oil passage 75 to the fastening hydraulic chamber 26 and the release hydraulic chamber 27.

In such a configuration, the hydraulic-pressure-receiving area of the second surface 24B of the piston 24 is set to be larger than the hydraulic-pressure-receiving area of the first surface 24A of the piston 24. For this reason, the hydraulic pressure applied on the first surface 24A from the side of the release hydraulic chamber 27 and the hydraulic pressure applied on the second surface 24B from the side of the fastening hydraulic chamber 26 are offset. The piston 24 is then moved in a fastening direction by the pressing force D1 based on a difference in the pressure-receiving area, the difference being generated because the pressure-receiving area of the second surface 24B is larger than the pressure-receiving area of the first surface 24A. When the friction plate unit 5 is shifted from the release position to the fastening position, the piston 24 is moved by weak pressing force D1 corresponding to the difference in the pressure-receiving area. It is thus possible to reduce a fastening shock of the friction plate unit 5. In addition, no complicated hydraulic pressure control is necessary to reduce the fastening shock. That is, it is possible to avoid control of reducing the flow rate of oil immediately before a stroke of a piston is completed. It is thus possible to reduce a fastening control time.

As the piston 24 includes the through-hole 243 for allowing the fastening hydraulic chamber 26 to communicate with the release hydraulic chamber 27, oil flows via the through-hole 243 into the fastening hydraulic chamber 26 if the pressure of the release hydraulic chamber 27 is increased. Consequently, when the piston 24 is moved in the fastening direction, the fastening hydraulic chamber 26 can receive the oil supplied from the release hydraulic chamber 27. It thus requires only a small amount of oil to be supplied through the first oil passage 74 to the fastening hydraulic chamber 26. That is, it is only required that an amount of oil for generating the pressing force D1 based on the difference in the pressure-receiving area is supplied via the linear solenoid valve 7 to the fastening hydraulic chamber 26.

The piston 24 can be moved with a small amount of oil, and thus it is possible to improve response when the friction plate unit 5 is fastened. This is effective in a case of increasing the clearance C between the drive plate 51 and the driven plate 52 for the purpose of reducing so-called drag resistance of the friction plate unit 5. That is, if the increased clearance C requires an increased amount of movement of the piston 24 needed for friction fastening, it requires only a relatively small amount of oil to be flown from the first oil passage 74 into the fastening hydraulic chamber 26. The response of friction fastening is not degraded. As a result, it is possible to reduce the drag resistance and improve the response of friction fastening.

The pressure ball 244, which regulates an oil flow from the fastening hydraulic chamber 26 to the release hydraulic chamber 27, is disposed in the through-hole 243. The pressure ball 244 closes the through-hole 243 if necessary to prevent a reverse oil flow. It is thus possible to separate the fastening hydraulic chamber 26 from the release hydraulic chamber 27 in the standpoint of a pressure, and to apply large pressing force D2 to the piston 24 toward the fastening direction.

The second oil passage 75 includes the reducing valve 6 that prevents the hydraulic pressure of the release hydraulic chamber 27 from exceeding a predetermined hydraulic pressure. As the reducing valve 6 regulates the hydraulic pressure of the release hydraulic chamber 27, the piston 24 can be smoothly moved in the fastening direction. Specifically, after the piston 24 abuts against the friction plate unit 5 and the clearance C between the plates 51 and 52 is reduced, a predetermined fastening hydraulic pressure is supplied through the first oil passage 74 to the fastening hydraulic chamber 26. Meanwhile, the hydraulic pressure of the release hydraulic chamber 27 is regulated by the reducing valve 6. As a result, the piston 24 can be quickly moved to the fastening position.

In addition, the automatic transmission 1 includes the linear solenoid valve 7 as a hydraulic pressure control valve for the fastening hydraulic chamber 26 and the release hydraulic chamber 27. It is thus possible to regulate the amount of oil supplied based on the amount of energization to a solenoid coil included in the linear solenoid valve 7, thus executing hydraulic pressure control with high precision.

First Modified Embodiment

Figure 10:
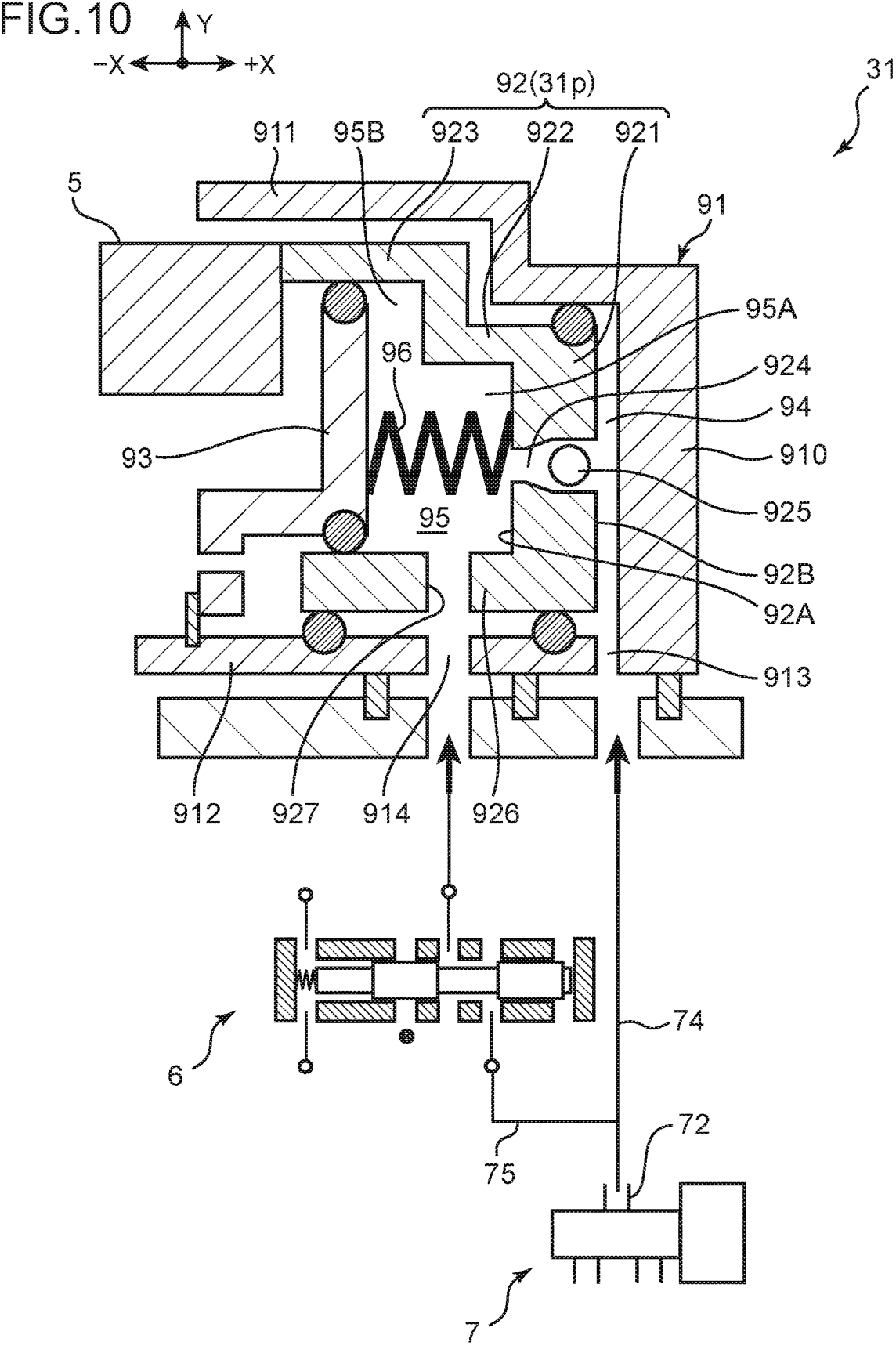
FIG. 10 shows a schematic cross-section of a configuration of one of the friction fastening elements, that is, a clutch according to a first modified embodiment of the present invention and a block configuration of a hydraulic mechanism of the clutch.

The embodiment described above shows the example of applying a friction fastening element including characteristics of the present invention to the second brake 22. The present invention is applicable not only to a brake for an automatic transmission but also to a clutch for an automatic transmission. FIG. 10 schematically shows an example of applying the present invention to the first clutch 31, which is one of the friction fastening elements included in the automatic transmission 1.

The first clutch 31 includes a drum 91, a piston 92, a sealing ring 93, a fastening hydraulic chamber 94, and a release hydraulic chamber 95. The first modified embodiment is similar to the above embodiment in that the first clutch 31 fastens and releases the friction plate unit 5, and the reducing valve 6 and the linear solenoid valve 7 are used as a hydraulic pressure mechanism for the first clutch 31.

The drum 91 is rotatably supported about an axis of a center shaft of the automatic transmission 1 by the transmission case 2. The drum 91 includes a disk part 910 extending in the Y direction, an outer cylinder part 911 having a larger diameter than the disk part 910 and extending from a radially outward edge of the disk part 910 in the −X direction, and an inner cylinder part 912 coaxially disposed inside the outer cylinder part 911. The inner cylinder part 912 has a first supply port 913 and a second supply port 914 for supplying a hydraulic pressure.

The piston 92 corresponds to the piston 31p shown in FIG. 1, and includes a pressure-receiving part 921, a small cylinder part 922, and a large cylinder part 923. The pressure-receiving part 921 includes a first surface 92A and a second surface 92B that receive a hydraulic pressure. The first surface 92A is placed on a side of the friction plate unit 5 and the second surface 92B is placed on the opposite side to the first surface 92A. In addition, the pressure-receiving part 921 includes a through-hole 924 axially passing through the pressure-receiving part 921, and a pressure ball 925 is disposed in the through-hole 924. An inner cylinder part 926 projects from a radially inward edge of the pressure-receiving part 921 in the −X direction. A third supply port 927 communicating with the second supply port 914 is formed in the inner cylinder part 926. An −X side edge of the large cylinder part 923 presses the friction plate unit 5. A sealing ring 93 is disposed between the piston 92 and the friction plate unit 5 and closes an opening between the large cylinder part 923 and the inner cylinder part 926.

The fastening hydraulic chamber 94 (the operation hydraulic chamber described above) is a space between the pressure-receiving part 921 of the piston 92 (on the side of the second surface 92B) and the disk part 910 of the drum 91, and receives a hydraulic pressure from the first oil passage 74 via the first supply port 913. The release hydraulic chamber 95 (the centrifugal balance hydraulic chamber described above) is a space defined by the pressure-receiving part 921 of the piston 92 (on the side of the first surface 92A), the small cylinder part 922, the large cylinder part 923, and the sealing ring 93, and receives a hydraulic pressure from the second oil passage 75 via the second supply port 914 and the third supply port 927. A return spring 96 that biases the piston 92 in the +X direction is disposed in the release hydraulic chamber 95. When the friction plate unit 5 is shifted from the released state to the fastened state, a hydraulic pressure is simultaneously supplied from the output port 72 of the linear solenoid valve 7 through the first oil passage 74 and the second oil passage 75 to the fastening hydraulic chamber 94 and the release hydraulic chamber 95.

The first surface 92A of the piston 92 receives a hydraulic pressure from the release hydraulic chamber 95 and the second surface 92B receives a hydraulic pressure from the fastening hydraulic chamber 94. In this case, the hydraulic-pressure-receiving area of the second surface 92B is set to be larger than the hydraulic-pressure-receiving area of the first surface 92A. The piston 92 includes the small cylinder part 922 and the large cylinder part 923 that are successively connected in the −X direction in the pressure-receiving part 921. The release hydraulic chamber 95 thus includes a small capacity part 95A on the +X side (within the small cylinder part 922) and a large capacity part 95B on the −X side (within the large cylinder part 923). In a clutch, the release hydraulic chamber 95 is required to have a function of canceling out a centrifugal hydraulic pressure of the fastening hydraulic chamber 94.

An operation of the first clutch 31 configured as described above is similar to the operation of the second brake 22 described in the above embodiment. When a hydraulic pressure is supplied to the fastening hydraulic chamber 94 and the release hydraulic chamber 95, the piston 92 is moved in the −X direction (fastening direction) by relatively small pressing force based on a difference in the pressure-receiving area between the first surface 92A and the second surface 92B. In initial fastening, the piston 92 continues to be moved for a certain period of time, based on the difference in the pressure-receiving area. When the reducing valve 6 starts to be operated, the second surface 92B receives large pressing force.

In the case of the first clutch 31, the vertical axis shown in FIG. 9 indicates a transmission torque of the clutch. During the period from the time point T3 in a zero-touch state to the time point T4 when the reducing valve 6 starts to be operated, the friction plate unit 5 is fastened with a small torque. It is thus possible to reduce a fastening shock. At the time point T4, the pressure of the fastening hydraulic chamber 94 is increased and thus large pressing force is applied to the piston 92, so that the transmission torque is also increased.

Second Modified Embodiment

Figure 11:
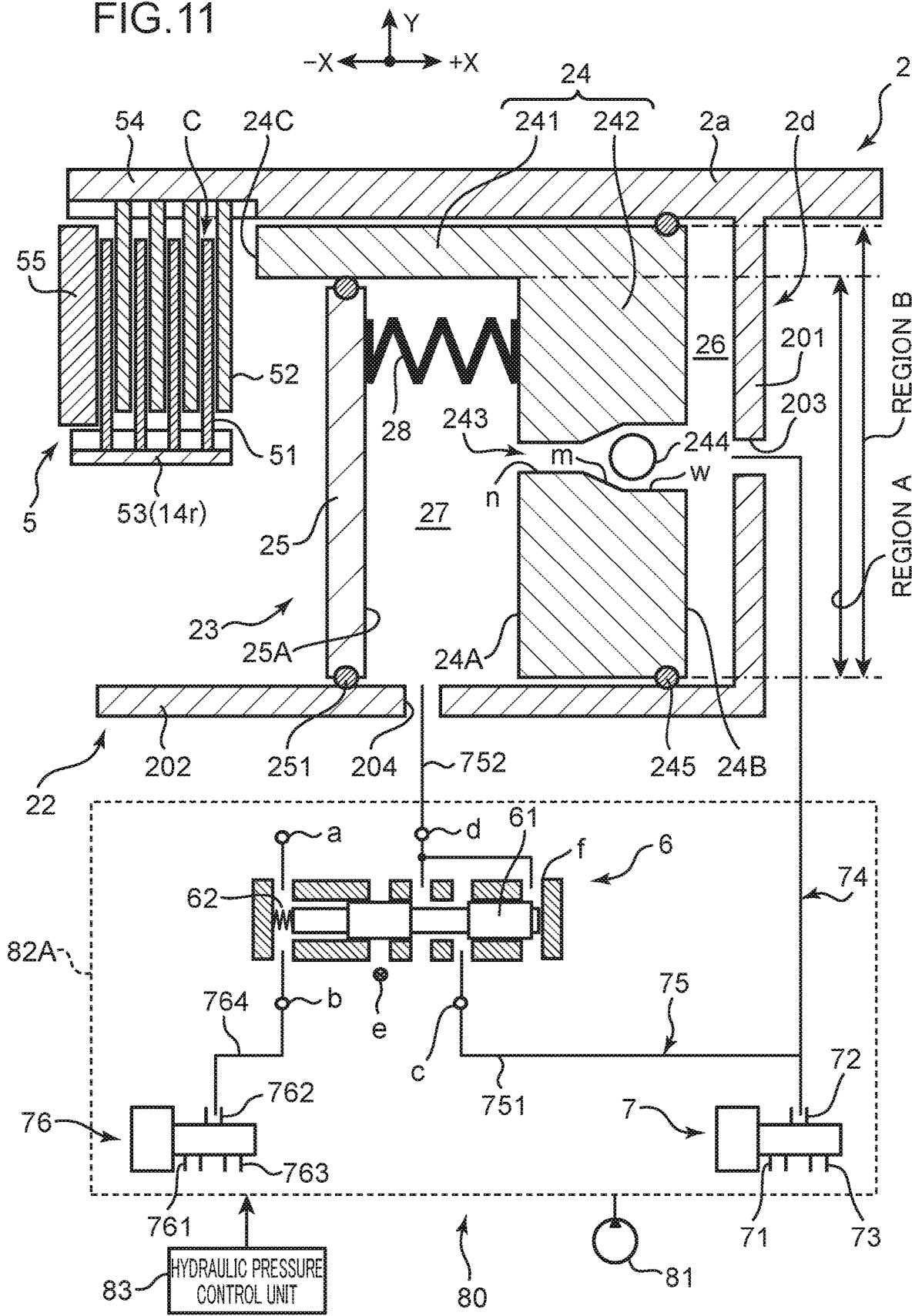
FIG. 11 shows a schematic cross-section of a configuration of a brake according to a second modified embodiment of the present invention and a block configuration of a hydraulic mechanism of the brake.

The embodiment described above shows the example in which the hydraulic circuit 82 includes the reducing valve 6 that prevents the hydraulic pressure of the release hydraulic chamber 27 from exceeding a predetermined hydraulic pressure. A second modified embodiment shows an example in which the hydraulic circuit 82 further includes a predetermined-hydraulic-pressure change unit capable of changing the predetermined hydraulic pressure of the reducing valve 6. FIG. 11 shows a schematic cross-section of a configuration of the second brake 22 according to the second modified embodiment and a block configuration of a hydraulic mechanism of the second brake 22. The second brake 22 according to the second modified embodiment is different from the second brake 22 shown in FIG. 3 in that a hydraulic circuit 82A includes a predetermined-hydraulic-pressure control valve 76 (predetermined-hydraulic-pressure change unit) that changes conditions for the reducing valve 6 to regulate the pressure of the release hydraulic chamber 27. Other portions are the same as in the embodiment described above, and thus descriptions thereof are appropriately omitted.

As described above, the reducing valve 6 includes a plurality of ports a, b, c, d, e, and f, and the spool 61 (valve body) that switches the ports. The input port c (first port) communicates with the output port 72 of the linear solenoid valve 7, and the output port d (second port) communicates with the release hydraulic chamber 27. The drain port e (third port) discharges the hydraulic pressure of the release hydraulic chamber 27 via the output port d. An output hydraulic pressure supplied from the output port d to the release hydraulic chamber 27 is applied to the feedback port f (fourth port). In addition, the feedback port f is used for moving the spool 61 in the −X direction (first direction) for the purpose of reducing the output hydraulic pressure.

The port a and the port b (fifth port) communicate with a spring chamber having the return spring 62 accommodated therein. The feedback port f is disposed at an end part of the spool 61 on the +X side, and the ports a and b opposing the feedback port f are disposed at an end part of the spool 61 on the −X side. In the present modified embodiment, the port a is closed, and a regulation hydraulic pressure for changing the operation hydraulic pressure of the reducing valve 6 is applied to the port b. That is, it is possible to change the predetermined hydraulic pressure at which the reducing valve 6 starts the pressure regulation operation, and thus it is possible to apply a regulation hydraulic pressure via the predetermined-hydraulic-pressure control valve 76 to the port b. When the regulation hydraulic pressure is applied via the port b to the spring chamber, force for moving the spool 61 in the +X direction (second direction) acts on the spool 61, against the output hydraulic pressure applied to the feedback port f.

The predetermined-hydraulic-pressure control valve 76 is a linear solenoid valve, and includes an input port 761 in which oil is introduced from the oil pump 81, an output port 762 (change output port) that outputs a hydraulic pressure, a drain port 763 that discharges oil, and a spool (not shown)

that is operated by energizing a coil. An oil passage 764 allows the output port 762 to communicate with the port b of the reducing valve 6. The predetermined-hydraulic-pressure control valve 76 is a normally closed type solenoid valve in which the output port 762 is always closed, that is, when the coil is not energized, the spool closes the output port 762.

When a regulation hydraulic pressure is applied from the predetermined-hydraulic-pressure control valve 76 to the spring chamber of the reducing valve 6, the input port 761 communicates with the output port 762 by an operation of the spool performed by energizing the coil. As the amount of energization to the coil is controlled, the regulation hydraulic pressure output from the output port 762 can be controlled. When the regulation hydraulic pressure is discharged, the output port 762 communicates with the drain port 763.

In the reducing valve 6, when the biasing force of the return spring 62 is larger than the output hydraulic pressure input from the output port d to the feedback port f, the input port c communicates with the output port d and the output hydraulic pressure is supplied to the release hydraulic chamber 27. Meanwhile, when the output hydraulic pressure exceeding the biasing force of the return spring 62 is input to the feedback port f, the spool 61 is moved in the −X direction by the hydraulic pressure and the output port d communicates with the drain port e. The operation when no regulation hydraulic pressure is supplied from the predetermined-hydraulic-pressure control valve 76 to the port b has been described above, and this operation is similar to that of the above embodiment.

Meanwhile, when the regulation hydraulic pressure is supplied to the port b, the force for moving the spool 61 in the +X direction is increased. That is, the operation hydraulic pressure of the reducing valve 6 is changed. In this case, unless an output hydraulic pressure higher than the output hydraulic pressure before the regulation hydraulic pressure is supplied is input to the feedback port f, the spool 61 is not moved in the −X direction. If the operation of supplying a regulation hydraulic pressure is performed, for example, after the clearance C between the plates 51 and 52 is reduced (FIG. 7), it is possible to reduce a speed at which the piston 24 is moved from a zero clearance position to a fastening position.

The operation hydraulic pressure of the reducing valve 6 may be changed depending only on a regulation hydraulic pressure supplied from the port b to the hydraulic chamber corresponding to the spring chamber, without using the return spring 62 in the reducing valve 6. In this case, it is possible to extend the range of accelerating or decelerating the movement speed of the piston 24.

According to the second modified embodiment, the regulation hydraulic pressure is supplied from the port b, and thus conditions for the reducing valve 6 to regulate the pressure of the release hydraulic chamber 27 can be changed. It is thus possible to control the operation of moving the piston 24 to the fastening position. The reducing valve 6 includes the port b to which a regulation hydraulic pressure is applied, for moving the spool 61 in the +X direction. The port b opposes the feedback port f for moving the spool 61 in the −X direction. As the regulation hydraulic pressure supplied from the port b is changed, conditions for the reducing valve 6 to regulate the pressure of the release hydraulic chamber 27 can be changed easily.

The predetermined-hydraulic-pressure control valve 76 is a normally closed type linear solenoid valve. For this reason, the regulation hydraulic pressure is not always applied to the port b. The regulation hydraulic pressure is applied to the port b only when necessary. It is thus possible to achieve a fail-safe function that allows the reducing valve 6 to be operated normally even if the predetermined-hydraulic-pressure control valve 76 fails, and thus it is possible to perform a friction fastening operation.

As described above, the automatic transmission 1 according to the present embodiments moves the piston 24, 92 based on a difference in the pressure-receiving area between the first surface 24A, 92A of the piston 24, 92 and the second surface 24B, 92B of the piston 24, 92. It is thus possible to reduce a fastening shock without requiring complicated hydraulic pressure control, and to shorten a fastening control time.

The embodiments described above exemplify a planetary gear automatic transmission. The present invention is applicable to other automatic transmissions such as a continuously variable transmission (CVT) and a dual clutch transmission (DCT).

Finally, characteristic configurations disclosed in the embodiments described above, and operations and effects based on such configurations are described.

An automatic transmission according to an aspect of the present invention includes a piston that has a first surface and a second surface opposing to each other in an axial direction and that is movable in the axial direction, a plurality of friction plates disposed on a side of the first surface of the piston, a fastening hydraulic chamber that applies a hydraulic pressure to the second surface of the piston to move the piston to a fastening position where the friction plates are pressed to be fastened to each other, a release hydraulic chamber that applies a hydraulic pressure to the first surface of the piston to move the piston to a release position where the friction plates are released, a hydraulic pressure control valve that has an output port of the hydraulic pressure, and supplies and discharges the hydraulic pressure to and from each of the fastening hydraulic chamber and the release hydraulic chamber, a first oil passage that allows the output port of the hydraulic pressure control valve to communicate with the fastening hydraulic chamber, and a second oil passage that allows the output port to communicate with the release hydraulic chamber. An area of the second surface of the piston for receiving the hydraulic pressure is set to be larger than an area of the first surface for receiving the hydraulic pressure.

According to the automatic transmission, a hydraulic pressure is supplied from the output port of the hydraulic pressure control valve through the first oil passage and the second oil passage to the fastening hydraulic chamber and the release hydraulic chamber. There is a difference in the pressure-receiving area between the first surface and the second surface of the piston. Accordingly, the hydraulic pressure applied on the first surface from the side of the release hydraulic chamber and the hydraulic pressure applied on the second surface from the side of the fastening hydraulic chamber are offset. The piston can be moved in a fastening direction by pressing force based on a difference in the pressure-receiving area, the difference being generated because the pressure-receiving area of the second surface is larger than the pressure-receiving area of the first surface. When the friction plates are shifted from the released state to the fastened state, the piston is moved by the pressing force corresponding to the difference in the pressure-receiving area. It is thus possible to reduce a fastening shock without requiring complicated hydraulic pressure control. In addition, it is possible to avoid control of reducing the flow rate of oil immediately before the stroke of the piston is completed for the purpose of reducing the fastening shock. It is thus possible to shorten a fastening control time.

In the automatic transmission described above, the piston preferably includes a through-hole that allows the fastening hydraulic chamber to communicate with the release hydraulic chamber.

According to the automatic transmission, because the piston includes the through-hole, oil flows via the through-hole into the fastening hydraulic chamber when the pressure of the release hydraulic chamber is increased. When the piston is moved in the fastening direction, the fastening hydraulic chamber can receive the oil supplied from the release hydraulic chamber. It thus requires only a small amount of oil to be supplied through the first oil passage to the fastening hydraulic chamber. It is thus possible to improve response when the friction plates are fastened to each other. Even when a clearance between the friction plates is increased for reducing so-called drag resistance, that is, even when the amount of movement of the piston required for friction fastening is increased, the amount of oil to be flown through the first oil passage into the fastening hydraulic chamber can be relatively small. It is thus possible to reduce the drag resistance and improve the response of friction fastening.

In the automatic transmission described above, a regulation part that regulates an oil flow from the fastening hydraulic chamber to the release hydraulic chamber is preferably provided in the through-hole.

According to the automatic transmission, the through-hole is closed when necessary to prevent a reverse oil flow, and a hydraulic pressure can be effectively received by the second surface.

In the automatic transmission described above, the second oil passage preferably includes a reducing valve that prevents the hydraulic pressure of the release hydraulic chamber from exceeding a predetermined hydraulic pressure.

According to the automatic transmission, by regulating the hydraulic pressure of the release hydraulic chamber using the reducing valve, it is possible to smoothly move the piston in the fastening direction. For example, after the piston abuts against the friction plates and the clearance between the friction plates is reduced, a predetermined fastening hydraulic pressure is supplied through the first oil passage to the fastening hydraulic chamber, while the hydraulic pressure of the release hydraulic chamber is regulated by the reducing valve. As a result, the piston can be quickly moved to the fastening position. Further, as the hydraulic pressure of the release hydraulic chamber is lower than that of the fastening hydraulic chamber, it is possible to ensure fastening force in friction fastening (force in the fastening direction of the piston).

Preferably, the automatic transmission described above further includes a predetermined-hydraulic-pressure change unit that changes the predetermined hydraulic pressure.

By changing the predetermined hydraulic pressure, it is possible to change conditions for the reducing valve to regulate the pressure of the release hydraulic chamber. As the conditions for regulating the pressure of the release hydraulic pressure are controlled, for example, the operation of moving the piston to the fastening position can be controlled.

In the automatic transmission described above, the reducing valve preferably includes a plurality of ports and a valve body that switches the plurality of ports. The plurality of ports preferably include a first port that communicates with the output port of the hydraulic pressure control valve, a second port that communicates with the release hydraulic chamber, a third port that discharges a hydraulic pressure of the release hydraulic chamber via the second port, a fourth port to which an output hydraulic pressure from the second port is applied and that moves the valve body in a first direction so as to reduce the output hydraulic pressure, and a fifth port that moves the valve body in a second direction opposite to the first direction. A regulation hydraulic pressure is preferably applied to the fifth port, and the predetermined-hydraulic-pressure change unit preferably changes the regulation hydraulic pressure so as to change the predetermined hydraulic pressure.

According to the automatic transmission, the reducing valve includes the fifth port functioning as a feedback port of the output hydraulic pressure. The fifth port is a port to which a regulation hydraulic pressure is applied, for moving the valve body in the second direction opposite to the first direction. The fifth port opposes the fourth port for moving the valve body in the first direction. Consequently, by changing the regulation hydraulic pressure, the conditions for the reducing valve to regulate the pressure of the release hydraulic chamber can be changed easily.

In this case, the predetermined-hydraulic-pressure change unit is preferably a predetermined-hydraulic-pressure control valve that includes a change output port communicating with the fifth port and controls the regulation hydraulic pressure, and the predetermined-hydraulic-pressure control valve is preferably a normally closed type solenoid valve in which the change output port is always closed.

According to the automatic transmission, the regulation hydraulic pressure is not always applied to the fifth port. The regulation hydraulic pressure is applied to the fifth port only when necessary. It is thus possible to allow the reducing valve to be operated normally even if the predetermined-hydraulic-pressure control valve fails, and thus it is possible to perform a friction fastening operation.

In the automatic transmission described above, the hydraulic pressure control valve is preferably constituted by a linear solenoid valve. It is thus possible to regulate the amount of oil supplied based on the amount of energization to a solenoid coil, thus executing hydraulic pressure control with high precision.

According to the present invention described above, the piston is moved based on a difference in the pressure-receiving area between the first surface and the second surface of the piston. It is thus possible to provide an automatic transmission including a friction fastening element that can reduce a fastening shock without requiring complicated hydraulic pressure control and can shorten a fastening control time.

The invention claimed is:
1. An automatic transmission comprising:
a piston that has a first surface and a second surface opposing to each other in an axial direction and that is movable in the axial direction;
a plurality of friction plates disposed on a side of the first surface of the piston;
a fastening hydraulic chamber that applies hydraulic pressure to the second surface of the piston to move the piston to a fastening position where the friction plates are pressed to be fastened to each other;
a release hydraulic chamber that applies hydraulic pressure to the first surface of the piston to move the piston to a release position where the friction plates are released;
a hydraulic pressure control valve that has an output port of the hydraulic pressure control valve to supply and discharge the hydraulic pressure to and from each of the fastening hydraulic chamber and the release hydraulic chamber;
a first oil passage that allows the output port of the hydraulic pressure control valve to communicate with the fastening hydraulic chamber; and
a second oil passage that allows the output port to communicate with the release hydraulic chamber, wherein
the piston includes a through-hole that allows the fastening hydraulic chamber to communicate with the release hydraulic chamber; and
an area of the second surface of the piston for receiving the hydraulic pressure is set to be larger than an area of the first surface for receiving the hydraulic pressure.

2. The automatic transmission according to claim 1, wherein a regulation part that regulates an oil flow from the fastening hydraulic chamber to the release hydraulic chamber is provided in the through-hole.

3. The automatic transmission according to claim 2, wherein the second oil passage includes a reducing valve that prevents the hydraulic pressure of the release hydraulic chamber from exceeding a predetermined hydraulic pressure.

4. The automatic transmission according to claim 3 further comprising a predetermined-hydraulic-pressure change unit that changes the predetermined hydraulic pressure.

5. The automatic transmission according to claim 4, wherein
the reducing valve includes a plurality of ports and a valve body that switches the plurality of ports,
the plurality of ports include
a first port that communicates with the output port of the hydraulic pressure control valve,
a second port that communicates with the release hydraulic chamber,
a third port that discharges the hydraulic pressure of the release hydraulic chamber via the second port,
a fourth port to which an output hydraulic pressure from the second port is applied and that moves the valve body in a first direction so as to reduce the output hydraulic pressure, and
a fifth port that moves the valve body in a second direction opposite to the first direction,
a regulation hydraulic pressure is applied to the fifth port, and
the predetermined-hydraulic-pressure change unit changes the regulation hydraulic pressure so as to change the predetermined hydraulic pressure.

6. The automatic transmission according to claim 5, wherein
the predetermined-hydraulic-pressure change unit is a predetermined-hydraulic-pressure control valve that includes a change output port communicating with the fifth port and controls the regulation hydraulic pressure, and
the predetermined-hydraulic-pressure control valve is a normally closed type solenoid valve in which the change output port is always closed.

7. The automatic transmission according to claim 2, wherein the hydraulic pressure control valve is constituted by a linear solenoid valve.

8. The automatic transmission according to claim 1, wherein the second oil passage includes a reducing valve that prevents the hydraulic pressure of the release hydraulic chamber from exceeding a predetermined hydraulic pressure.

9. The automatic transmission according to claim 8 further comprising a predetermined-hydraulic-pressure change unit that changes the predetermined hydraulic pressure.

10. The automatic transmission according to claim 9, wherein the hydraulic pressure control valve is constituted by a linear solenoid valve.

11. The automatic transmission according to claim 8, wherein the hydraulic pressure control valve is constituted by a linear solenoid valve.

12. The automatic transmission according to claim 1, wherein the hydraulic pressure control valve is constituted by a linear solenoid valve.

13. An automatic transmission comprising:
a piston that has a first surface and a second surface opposing to each other in an axial direction and that is movable in the axial direction;
a plurality of friction plates disposed on a side of the first surface of the piston;
a fastening hydraulic chamber that applies hydraulic pressure to the second surface of the piston to move the piston to a fastening position where the friction plates are pressed to be fastened to each other;
a release hydraulic chamber that applies hydraulic pressure to the first surface of the piston to move the piston to a release position where the friction plates are released;
a hydraulic pressure control valve that has an output port of the hydraulic pressure of control valve to supply and discharge the hydraulic pressure to and from each of the fastening hydraulic chamber and the release hydraulic chamber;
a first oil passage that allows the output port of the hydraulic pressure control valve to communicate with the fastening hydraulic chamber;
a second oil passage that allows the output port to communicate with the release hydraulic chamber, and
a predetermined-hydraulic-pressure change unit that changes the predetermined hydraulic pressure, wherein
an area of the second surface of the piston for receiving the hydraulic pressure is set to be larger than an area of the first surface for receiving the hydraulic pressure,
the second oil passage includes a reducing valve that prevents the hydraulic pressure of the release hydraulic chamber from exceeding a predetermined hydraulic pressure,
and wherein
the reducing valve includes a plurality of ports and a valve body that switches the plurality of ports,
the plurality of ports include:
a first port that communicates with the output port of the hydraulic pressure control valve,
a second port that communicates with the release hydraulic chamber,
a third port that discharges the hydraulic pressure of the release hydraulic chamber via the second port,
a fourth port to which an output hydraulic pressure from the second port is applied and that moves the valve body in a first direction so as to reduce the output hydraulic pressure, and
a fifth port that moves the valve body in a second direction opposite to the first direction,
a regulation hydraulic pressure is applied to the fifth port, and
the predetermined-hydraulic-pressure change unit changes the regulation hydraulic pressure so as to change the predetermined hydraulic pressure.

14. The automatic transmission according to claim 13, wherein the predetermined-hydraulic-pressure change unit is a predetermined-hydraulic-pressure control valve that includes a change output port communicating with the fifth port and controls the regulation hydraulic pressure, and the predetermined-hydraulic-pressure control valve is a normally closed type solenoid valve in which the change output port is always closed.

15. The automatic transmission according to claim 14, wherein the hydraulic pressure control valve is constituted by a linear solenoid valve.

16. The automatic transmission according to claim 13, wherein the hydraulic pressure control valve is constituted by a linear solenoid valve.

* * * * *